United States Patent
Zhang et al.

(10) Patent No.: US 12,275,379 B2
(45) Date of Patent: Apr. 15, 2025

(54) AUTOMATIC VEHICLE WINDOW CLEANING METHOD AND APPARATUS

(71) Applicant: SHENZHEN YINWANG INTELLIGENT TECHNOLOGIES CO., LTD., Shenzhen (CN)

(72) Inventors: Junhao Zhang, Shanghai (CN); Gailiang Wang, Shanghai (CN); Wei Huang, Munich (DE); Wenkang Xu, Shenzhen (CN); Xiaolin Huang, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 17/678,334

(22) Filed: Feb. 23, 2022

(65) Prior Publication Data
US 2022/0176912 A1    Jun. 9, 2022

Related U.S. Application Data

(63) Continuation of application No. PCT/CN2020/102184, filed on Jul. 15, 2020.

(30) Foreign Application Priority Data

Aug. 23, 2019    (CN) .......................... 201910786726.5

(51) Int. Cl.
*B60S 1/02*    (2006.01)
*B60S 1/08*    (2006.01)
(Continued)

(52) U.S. Cl.
CPC ........... *B60S 1/0844* (2013.01); *B60S 1/0896* (2013.01); *B60S 1/485* (2013.01); *G06V 10/56* (2022.01); *G06V 20/56* (2022.01); *G06V 20/58* (2022.01)

(58) Field of Classification Search
CPC ...... B60S 1/0844; B60S 1/0896; B60S 1/485; B60S 1/02; G06V 10/56; G06V 20/56; G06V 20/58; B60H 1/00785
See application file for complete search history.

(56) References Cited

U.S. PATENT DOCUMENTS

| | | | |
|---|---|---|---|
| 2003/0169902 A1* | 9/2003 | Satoh | ..................... G08G 1/166 |
| | | | 348/E7.086 |
| 2004/0000631 A1 | 1/2004 | Stam et al. | |

(Continued)

FOREIGN PATENT DOCUMENTS

| | | |
|---|---|---|
| CN | 1270560 A | 10/2000 |
| CN | 101055208 A | 10/2007 |

(Continued)

OTHER PUBLICATIONS

Mohd Helmy Abd Wahab et al., "Review on Raindrop Detection and Removal in Weather Degraded Images", 2013 5th International Conference on Computer Science and Information Technology (CSIT), Total 7 Pages.

(Continued)

*Primary Examiner* — Samir A Ahmed
(74) *Attorney, Agent, or Firm* — Conley Rose, P.C.

(57) ABSTRACT

An automatic vehicle window cleaning method and apparatus includes obtaining a vehicle window image; determining a dark channel image corresponding to a single frame of vehicle window image; further determining, based on a quantity of pixels whose gray values exceed a preset gray threshold in the dark channel image and/or definition of the dark channel image, that a first-type foreign object exists on a vehicle window, and/or determining, based on RGB values of pixels in i consecutive frames of vehicle window images, that a second-type foreign object exists on the vehicle window, and controlling a cleaning tool to remove a foreign (Continued)

object. The foreign object includes the first-type foreign object and/or the second-type foreign object.

15 Claims, 5 Drawing Sheets

(51) Int. Cl.
  *B60S 1/48* (2006.01)
  *G06V 10/56* (2022.01)
  *G06V 20/56* (2022.01)
  *G06V 20/58* (2022.01)

(56) References Cited

U.S. PATENT DOCUMENTS

| | | | |
|---|---|---|---|
| 2007/0235549 | A1 | 10/2007 | Nakajima |
| 2012/0169878 | A1 | 7/2012 | Heenan et al. |
| 2013/0071043 | A1 | 3/2013 | Bai |
| 2015/0332099 | A1 | 11/2015 | Kosubek et al. |
| 2015/0339811 | A1 | 11/2015 | Zhong et al. |
| 2019/0019042 | A1* | 1/2019 | Tanigawa ............... G06V 10/82 |
| 2020/0156437 | A1 | 5/2020 | Sakurada |

FOREIGN PATENT DOCUMENTS

| | | |
|---|---|---|
| CN | 202413712 U | 9/2012 |
| CN | 104077750 A | 10/2014 |
| CN | 102999883 B | 3/2016 |
| CN | 106218587 A | 12/2016 |
| CN | 106462737 A | 2/2017 |
| CN | 107554485 A | 1/2018 |
| CN | 207257290 U | 4/2018 |
| CN | 108263343 A | 7/2018 |
| CN | 108528395 A | 9/2018 |
| CN | 108860064 A | 11/2018 |
| CN | 109241818 A | 1/2019 |
| CN | 111055811 A | 4/2020 |
| CN | 111196122 A | 5/2020 |
| DE | 3521024 A1 | 1/1986 |
| DE | 102014207994 A1 * | 10/2015 |
| EP | 2899692 A1 * | 7/2015 |
| KR | 20160132673 A | 11/2016 |

OTHER PUBLICATIONS

Hiroyuki Kurihata et al., "Rainy Weather Recognition from In-Vehicle Camera Images for Driver Assistance," 2005 IEEE, 6 pages.

William J. Fleming, "New Automotive Sensors—A Review," IEEE Sensors Journal, vol. 8, No. 11, Nov. 2008, 22 pages.

Nils Einecke et al., "Detection of Camera Artifacts from Camera Images," IEEE 17th International Conference on Intelligent Transportation Systems (ITSC), Oct. 8-11, 2014, 8 pages.

* cited by examiner

AUTOMATIC VEHICLE WINDOW CLEANING METHOD AND APPARATUS

CROSS-REFERENCE TO RELATED APPLICATIONS

This is a continuation of International Patent Application No. PCT/CN2020/102184, filed on Jul. 15, 2020, which claims priority to Chinese Patent Application No. 201910786726.5, filed on Aug. 23, 2019. The disclosures of the aforementioned applications are hereby incorporated by reference in their entireties.

TECHNICAL FIELD

This application relates to the field of communications technologies, and in particular, to an automatic vehicle window cleaning method and apparatus.

BACKGROUND

During traveling of a vehicle, because a difference between temperatures inside and outside the vehicle is excessively large, water fog and even frost or the like are generated on a vehicle window, obscuring a driver's line-of-sight. As a result, the driver needs to manually control a defogging system to perform a defog operation. In addition, due to impact of an ambient environment, a foreign object such as a leaf or dust may appear on the vehicle window. The driver also needs to manually operate a cleaning apparatus, such as a windshield wiper or a cleaning liquid spraying apparatus, to remove the foreign object. This causes inconvenience to a driving process of the driver, and reduces efficiency of cleaning the foreign object on the vehicle window.

SUMMARY

This application provides an automatic vehicle window cleaning method, to automatically clean a vehicle window and improve efficiency of cleaning a foreign object on the vehicle window.

To achieve the foregoing objective, the following technical solutions are used in this application.

According to a first aspect, an embodiment of this application provides an automatic vehicle window cleaning method, and the method is applied to a vehicle. The method includes obtaining a vehicle window image; determining a dark channel image corresponding to a single frame of vehicle window image; determining, based on a quantity of pixels whose gray values exceed a preset gray threshold in the dark channel image and/or definition of the dark channel image, that a first-type foreign object exists on a vehicle window; and/or determining, based on RGB values of pixels in i consecutive frames of vehicle window images, that a second-type foreign object exists on the vehicle window; and controlling a cleaning tool to remove the first-type foreign object and/or the second-type foreign object.

In the automatic vehicle window cleaning method described in this embodiment of this application, the gray value of the pixel in the dark channel image corresponding to the single frame of vehicle window image is used to detect the first-type foreign object on the vehicle window, and/or the RGB values of the pixels in the i consecutive frames of vehicle window images are used to detect the second-type foreign object on the vehicle window. If the first-type foreign object and the second-type foreign object both exist or either of the first-type foreign object and the second-type foreign object exists on the vehicle window, the cleaning tool is controlled to remove the foreign object. The foreign object is first detected before being cleaned, so that blind cleaning can be reduced, thereby improving cleaning efficiency and saving cleaning resources. In addition, by using the foregoing process, the vehicle window may be automatically cleaned in this embodiment of this application, thereby reducing a manual operation and improving security in a vehicle traveling process.

In a possible implementation, the determining, based on red, green, blue (RGB) values of pixels in i consecutive frames of vehicle window images, that a second-type foreign object exists on the vehicle window includes first establishing an image background model based on the RGB values of the pixels in the i consecutive frames of vehicle window images; then determining a first region based on an RGB value of a pixel in the image background model; and further determining that the second-type foreign object exists in the first region. The RGB value of the pixel in the image background model represents a change of an RGB value of a pixel at a same location in the i consecutive frames of vehicle window images, i is an integer greater than 1, and the first region is a vehicle window region corresponding to a pixel whose RGB value does not change in the i consecutive frames of vehicle window images.

In the automatic vehicle window cleaning method described in this embodiment of this application, in a vehicle traveling process, when a foreign object such as a falling leaf exists on the vehicle window, a picture (a pixel value) of a location on the vehicle window other than a location at which the falling leaf exists changes with traveling of the vehicle, and a picture (a pixel value) of the location, on the vehicle window, at which the falling leaf exists does not change or changes to a relatively small degree with traveling of the vehicle. Therefore, when it is determined, based on the RGB value of the pixel in the image background model that may represent the change of the RGB value of the pixel at the same location in the i consecutive frames of vehicle window images, the first region in which the second-type foreign object exists on the vehicle window, accuracy of determining that the second-type foreign object exists on the vehicle window and determining the first region in which the second-type foreign object exists on the vehicle window can be improved.

In a possible implementation, after the determining a first region based on an RGB value of a pixel in the image background model, the method further includes determining, in each of j consecutive frames of vehicle window images, a second region corresponding to the first region, to obtain j second regions; and if an RGB value of a pixel at a same location in the j second regions does not change, determining that the second-type foreign object exists in the first region. The j consecutive frames of vehicle window images are located after the i consecutive frames of vehicle window images, and j is an integer greater than 1.

In the automatic vehicle window cleaning method described in this embodiment of this application, after the first region on the vehicle window is determined based on the i consecutive frames of vehicle window images, it is further determined, based on the first region and the second regions in the j consecutive frames of vehicle window images and based on the change of the pixel at the same location in the second regions, that the second-type foreign object exists in the first region, so as to further improve accuracy of detecting that the second-type foreign object exists on the vehicle window.

In a possible implementation, the determining, based on a quantity of pixels whose gray values exceed a preset gray threshold in the dark channel image and/or definition of the dark channel image, that a first-type foreign object exists on a vehicle window includes, if a quantity of pixels whose gray values each do not exceed the preset gray threshold in the dark channel image is less than or equal to the quantity of pixels whose gray values exceed the preset gray threshold in the dark channel image, and/or the definition of the dark channel image is lower than preset definition, determining that the first-type foreign object exists on the vehicle window. The definition of the dark channel image is a variance of gray values of pixels in the dark channel image.

In a possible implementation, the establishing an image background model based on the RGB values of the pixels in the i consecutive frames of vehicle window images includes determining an average value image of the i consecutive frames of vehicle window images based on an average value of RGB values of pixels at a same location in the i consecutive frames of vehicle window images; and then establishing the image background model based on a difference between an RGB value of a pixel in the average value image of the i consecutive frames of vehicle window images and an RGB value of a pixel in an $i^{th}$ frame of vehicle window image.

In a possible implementation, the determining a first region based on an RGB value of a pixel in the image background model includes determining the first region based on the RGB value of the pixel in the image background model and a first preset algorithm. The first preset algorithm is a saliency detection algorithm or a target detection algorithm.

In a possible implementation, before the determining that the second-type foreign object exists in the first region, the method further includes first determining a third region that is in the image background model and that corresponds to the first region; then determining a difference between an RGB value of a pixel in each second region and an RGB value of a pixel at a same location in the third region, and accumulating the differences to obtain an accumulated value; and if the accumulated value exceeds a preset threshold, determining that the RGB value of the pixel at the same location in the j second regions changes.

In a possible implementation, the controlling a cleaning tool to remove a foreign object includes controlling, based on temperature data inside and outside the vehicle, a first cleaning tool to be enabled for preset duration to remove the first-type foreign object; and/or first determining working duration of a second cleaning tool based on a traveling status and/or a driver status, a first preset weight parameter corresponding to the traveling status and/or a first preset weight parameter corresponding to the driver status, and maximum duration in which the second cleaning tool continuously works; then determining a working frequency of the second cleaning tool based on the traveling status and/or the driver status, a second preset weight parameter corresponding to the traveling status and/or a second preset weight parameter corresponding to the driver status, and a maximum frequency at which the second cleaning tool works; and finally controlling, based on the working duration of the second cleaning tool and the working frequency of the second cleaning tool, the second cleaning tool to clean the first region to remove the second-type foreign object.

In the automatic vehicle window cleaning method described in this embodiment of this application, in different traveling statuses or different driver statuses, adaptive adjustment is performed on the working duration and the working frequency of the second cleaning tool, to minimize impact of vehicle window cleaning on a driver and ensure security in a vehicle traveling process.

In a possible implementation, the determining working duration of a second cleaning tool based on a traveling status and/or a driver status, a first preset weight parameter corresponding to the traveling status and/or a first preset weight parameter corresponding to the driver status, and maximum duration in which the second cleaning tool continuously works includes determining the working duration of the second cleaning tool based on the traveling status, the driver status, the first preset weight parameter corresponding to the traveling status, the first preset weight parameter corresponding to the driver status, the maximum duration in which the second cleaning tool continuously works, and a second preset algorithm. The second preset algorithm is $t_1 = t_{s-max} * (1 - e^{(\alpha_1 s_1^{-1} + \beta_1 s_2^{-1})})$, where $t_1$ is the working duration of the second cleaning tool, $t_{s-max}$ is the maximum duration in which the second cleaning tool continuously works, e is a base of a natural logarithm, $\alpha_1$ and $\beta_1$ are respectively the first preset weight parameters corresponding to the traveling status and the driver status, $\alpha_1 + \beta_1 = 1$, $s_1$ represents the traveling status, and $s_2$ represents the driver status.

In a possible implementation, the determining a working frequency of the second cleaning tool based on the traveling status and/or the driver status, a second preset weight parameter corresponding to the traveling status and/or a second preset weight parameter corresponding to the driver status, and a maximum frequency at which the second cleaning tool works includes determining the working frequency of the second cleaning tool based on the traveling status, the driver status, the second preset weight parameter corresponding to the traveling status, the second preset weight parameter corresponding to the driver status, the maximum frequency at which the second cleaning tool works, and a third preset algorithm. The third preset algorithm is $f = f_{max} * (1 - e^{(\alpha_2 s_1^{-1} + \beta_2 s_2^{-1})})$, where f is the working frequency of the second cleaning tool, $f_{max}$ is the maximum frequency at which the second cleaning tool works, e is the base of the natural logarithm, $\alpha_2$ and $\beta_2$ are respectively the second preset weight parameters corresponding to the traveling status and the driver status, $\alpha_2 + \beta_2 = 1$, $s_1$ represents the traveling status, and $s_2$ represents the driver status.

In a possible implementation, after the controlling, based on the working duration of the second cleaning tool and the working frequency of the second cleaning tool, the second cleaning tool to clean the first region, the method further includes first determining working duration of a third cleaning tool based on the traveling status and/or the driver status, a third preset weight parameter corresponding to the traveling status and/or a third preset weight parameter corresponding to the driver status, and maximum duration in which the third cleaning tool continuously works; then determining a working interval of the third cleaning tool based on the traveling status and/or the driver status, fourth preset weight parameters corresponding to the traveling status and the driver status, and a maximum interval at which the third cleaning tool works; and finally controlling, based on the working duration of the third cleaning tool and the working interval of the third cleaning tool, the third cleaning tool to clean the first region; and controlling, based on the working duration of the second cleaning tool and the working frequency of the second cleaning tool, the second cleaning tool to clean the first region, to remove the second-type foreign object.

In the automatic vehicle window cleaning method described in this embodiment of this application, in different traveling statuses or different driver statuses, adaptive adjustment is performed on the working duration and the working frequency of the second cleaning tool, to minimize impact of vehicle window cleaning on a driver and ensure security in a vehicle traveling process. Using various cleaning tools to automatically clean the vehicle window may improve cleaning efficiency to a maximum degree, so as to further improve security in the vehicle traveling process.

In a possible implementation, the determining working duration of a third cleaning tool based on the traveling status and/or the driver status, a third preset weight parameter corresponding to the traveling status and/or a third preset weight parameter corresponding to the driver status, and maximum duration in which the third cleaning tool continuously works includes determining the working duration of the third cleaning tool based on the traveling status, the driver status, the third preset weight parameter corresponding to the traveling status, the third preset weight parameter corresponding to the driver status, the maximum duration in which the third cleaning tool continuously works, and a fourth preset algorithm. The fourth preset algorithm is $t_2=t_{1-max}*(1-e^{(\alpha_3 s_1^{-1}+\beta_3 s_2^{-1})})$, where $t_2$ is the working duration of the third cleaning tool, $t_{1-max}$ is the maximum duration in which the third cleaning tool continuously works, e is the base of the natural logarithm, $\alpha_3$ and $\beta_3$ are respectively the third preset weight parameters corresponding to the traveling status and the driver status, $\alpha_3+\beta_3=1$, $s_1$ represents the traveling status, and $s_2$ represents the driver status.

In a possible implementation, the determining a working interval of the third cleaning tool based on the traveling status and/or the driver status, fourth preset weight parameters corresponding to the traveling status and the driver status, and a maximum interval at which the third cleaning tool works includes determining the working interval of the third cleaning tool based on the traveling status, the driver status, the fourth preset weight parameter corresponding to the traveling status, the fourth preset weight parameter corresponding to the driver status, the maximum interval at which the third cleaning tool works, and a fifth preset algorithm. The fifth preset algorithm is $\Delta t=\Delta t_{max}*(1-e^{(\alpha_4 s_1^{-1}+\beta_4 s_2^{-1})})$, where $\Delta t$ is the working interval of the third cleaning tool, $\Delta t_{max}$ is the maximum interval at which the third cleaning tool works, e is the base of the natural logarithm, $\alpha_4$ and $\beta_4$ are respectively the fourth preset weight parameters corresponding to the traveling status and the driver status, $\alpha_4+\beta_4=1$, $s_1$ represents the traveling status, and $s_2$ represents the driver status.

According to a second aspect, an embodiment of this application provides an automatic vehicle window cleaning apparatus. The apparatus is applied to a vehicle, and the apparatus includes an obtaining unit, a determining unit, and a control unit. The obtaining unit is configured to obtain a vehicle window image. The determining unit is configured to determine a dark channel image corresponding to a single frame of vehicle window image. The determining unit is further configured to determine, based on a quantity of pixels whose gray values exceed a preset gray threshold in the dark channel image and/or definition of the dark channel image, that a first-type foreign object exists on a vehicle window; and/or the determining unit is further configured to determine, based on RGB values of pixels in i consecutive frames of vehicle window images, that a second-type foreign object exists on the vehicle window. The control unit is configured to control a cleaning tool to remove the first-type foreign object and/or the second-type foreign object.

In a possible implementation, the determining unit is configured to first establish an image background model based on the RGB values of the pixels in the i consecutive frames of vehicle window images; then determine a first region based on an RGB value of a pixel in the image background model; and further determine that the second-type foreign object exists in the first region. The first region is a vehicle window region corresponding to a pixel whose RGB value does not change in the i consecutive frames of vehicle window images, the RGB value of the pixel in the image background model represents a change of an RGB value of a pixel at a same location in the i consecutive frames of vehicle window images, and i is an integer greater than 1.

In a possible implementation, after determining the first region based on the RGB value of the pixel in the image background model, the determining unit is further configured to determine, in each of j consecutive frames of vehicle window images, a second region corresponding to the first region, to obtain j second regions; and if an RGB value of a pixel at a same location in the j second regions does not change, determine that the second-type foreign object exists in the first region. The j consecutive frames of vehicle window images are located after the i consecutive frames of vehicle window images, and j is an integer greater than 1.

In a possible implementation, the determining unit is configured to, if a quantity of pixels whose gray values each do not exceed the preset gray threshold in the dark channel image is less than or equal to the quantity of pixels whose gray values exceed the preset gray threshold in the dark channel image, and/or the definition of the dark channel image is lower than preset definition, determine that the first-type foreign object exists on the vehicle window. The definition of the dark channel image is a variance of gray values of pixels in the dark channel image.

In a possible implementation, the determining unit is configured to determine an average value image of the i consecutive frames of vehicle window images based on an average value of RGB values of pixels at a same location in the i consecutive frames of vehicle window images; and then establish the image background model based on a difference between an RGB value of a pixel in the average value image of the i consecutive frames of vehicle window images and an RGB value of a pixel in an $i^{th}$ frame of vehicle window image.

In a possible implementation, the determining unit is configured to determine the first region based on the RGB value of the pixel in the image background model and a first preset algorithm. The first preset algorithm is a saliency detection algorithm or a target detection algorithm.

In a possible implementation, the determining unit is further configured to first determine a third region that is in the image background model and that corresponds to the first region; then determine a difference between an RGB value of a pixel in each second region and an RGB value of a pixel at a same location in the third region, and accumulate the differences to obtain an accumulated value; and if the accumulated value exceeds a preset threshold, determine that the RGB value of the pixel at the same location in the j second regions changes.

In a possible implementation, the control unit is configured to control, based on temperature data inside and outside the vehicle, a first cleaning tool to be enabled for preset duration to remove the first-type foreign object; and/or first determine working duration of a second cleaning tool based on a traveling status and/or a driver status, a first preset weight parameter corresponding to the traveling status and/or a first preset weight parameter corresponding to the driver status, and maximum duration in which the second cleaning tool continuously works; then determine a working frequency of the second cleaning tool based on the traveling status and/or the driver status, a second preset weight parameter corresponding to the traveling status and/or a second preset weight parameter corresponding to the driver status, and a maximum frequency at which the second cleaning tool works; and finally control, based on the working duration of the second cleaning tool and the working frequency of the second cleaning tool, the second cleaning tool to clean the first region to remove the second-type foreign object.

In a possible implementation, that the control unit is configured to determine working duration of a second cleaning tool based on a traveling status and/or a driver status, a first preset weight parameter corresponding to the traveling status and/or a first preset weight parameter corresponding to the driver status, and maximum duration in which the second cleaning tool continuously works includes determining the working duration of the second cleaning tool based on the traveling status, the driver status, the first preset weight parameter corresponding to the traveling status, the first preset weight parameter corresponding to the driver status, the maximum duration in which the second cleaning tool continuously works, and a second preset algorithm. The second preset algorithm is $t_1=t_{s\text{-}max}*(1-e^{(\alpha_1 s_1^{-1}+\beta_1 s_2^{-1})})$, where $t_1$ is the working duration of the second cleaning tool, $t_{s\text{-}max}$ is the maximum duration in which the second cleaning tool continuously works, e is a base of a natural logarithm, $\alpha_1$ and $\beta_1$ are respectively the first preset weight parameters corresponding to the traveling status and the driver status, $\alpha_1+\beta_1=1$, $s_1$ represents the traveling status, and $s_2$ represents the driver status.

In a possible implementation, that the control unit is configured to determine a working frequency of the second cleaning tool based on the traveling status and/or the driver status, a second preset weight parameter corresponding to the traveling status and/or a second preset weight parameter corresponding to the driver status, and a maximum frequency at which the second cleaning tool works includes determining the working frequency of the second cleaning tool based on the traveling status, the driver status, the second preset weight parameter corresponding to the traveling status, the second preset weight parameter corresponding to the driver status, the maximum frequency at which the second cleaning tool works, and a third preset algorithm. The third preset algorithm is $f=f_{max}*(1-e^{(\alpha_2 s_1^{-1}+\beta_2 s_2^{-1})})$, where f is the working frequency of the second cleaning tool, $f_{max}$ is the maximum frequency at which the second cleaning tool works, e is the base of the natural logarithm, $\alpha_2$ and $\beta_2$ are respectively the second preset weight parameters corresponding to the traveling status and the driver status, $\alpha_2+\beta_2=1$, $s_1$ represents the traveling status, and $s_2$ represents the driver status.

In a possible implementation, after the control unit is configured to control, based on the working duration of the second cleaning tool and the working frequency of the second cleaning tool, the second cleaning tool to clean the first region, the control unit is further configured to first determine working duration of a third cleaning tool based on the traveling status and/or the driver status, a third preset weight parameter corresponding to the traveling status and/or a third preset weight parameter corresponding to the driver status, and maximum duration in which the third cleaning tool continuously works; then determine a working interval of the third cleaning tool based on the traveling status and/or the driver status, fourth preset weight parameters corresponding to the traveling status and the driver status, and a maximum interval at which the third cleaning tool works; and finally control, based on the working duration of the third cleaning tool and the working interval of the third cleaning tool, the third cleaning tool to clean the first region; and control, based on the working duration of the second cleaning tool and the working frequency of the second cleaning tool, the second cleaning tool to clean the first region, to remove the second-type foreign object.

In a possible implementation, that the control unit is configured to determine working duration of a third cleaning tool based on the traveling status and/or the driver status, a third preset weight parameter corresponding to the traveling status and/or a third preset weight parameter corresponding to the driver status, and maximum duration in which the third cleaning tool continuously works includes determining the working duration of the third cleaning tool based on the traveling status, the driver status, the third preset weight parameter corresponding to the traveling status, the third preset weight parameter corresponding to the driver status, the maximum duration in which the third cleaning tool continuously works, and a fourth preset algorithm. The fourth preset algorithm is $t_2=t_{1\text{-}max}*(1-e^{(\alpha_3 s_1^{-1}+\beta_3 s_2^{-1})})$, where $t_2$ is the working duration of the third cleaning tool, $t_{1\text{-}max}$ is the maximum duration in which the third cleaning tool continuously works, e is the base of the natural logarithm, $\alpha_3$ and $\beta_3$ are respectively the third preset weight parameters corresponding to the traveling status and the driver status, $\beta_3+\beta_3=1$, $s_1$ represents the traveling status, and $s_2$ represents the driver status.

In a possible implementation, that the control unit is configured to determine a working interval of the third cleaning tool based on the traveling status and/or the driver status, fourth preset weight parameters corresponding to the traveling status and the driver status, and a maximum interval at which the third cleaning tool works includes determining the working interval of the third cleaning tool based on the traveling status, the driver status, the fourth preset weight parameter corresponding to the traveling status, the fourth preset weight parameter corresponding to the driver status, the maximum interval at which the third cleaning tool works, and a fifth preset algorithm. The fifth preset algorithm is $\Delta t=\Delta t_{max}*(1-e^{(\alpha_4 s_1^{-1}+\beta_4 s_2^{-1})})$, where $\Delta t$ is the working interval of the third cleaning tool, $\Delta t_{max}$ is the maximum interval at which the third cleaning tool works, e is the base of the natural logarithm, $\alpha_4$ and $\beta_4$ are respectively the fourth preset weight works, parameters corresponding to the traveling status and the driver status, $\alpha_4+\beta_4=1$, $s_1$ represents the traveling status, and $s_2$ represents the driver status.

According to a third aspect, an automatic vehicle window cleaning apparatus is provided, including a processor and a memory. The memory is configured to store computer executable instructions. When the automatic vehicle window cleaning apparatus runs, the processor executes the computer executable instructions stored in the memory, so that the automatic vehicle window cleaning apparatus performs the automatic vehicle window cleaning method according to any one of the first aspect and the possible implementations of the first aspect.

According to a fourth aspect, an embodiment of this application further provides a computer-readable storage medium including instructions. When the instructions are run on a computer, the computer is enabled to perform the automatic vehicle window cleaning method according to any one of the first aspect and the possible implementations of the first aspect.

According to a fifth aspect, an embodiment of this application further provides a computer program product including instructions. When the computer program product is run on a computer, the computer is enabled to perform the automatic vehicle window cleaning method according to any one of the first aspect and the possible implementations of the first aspect.

DESCRIPTION OF EMBODIMENTS

An automatic vehicle window cleaning method provided in the embodiments of this application is applied to a vehicle, or is applied to another device (such as a cloud server) that has a vehicle window cleaning function. The vehicle may use components (including hardware and software) included in the vehicle to implement the automatic vehicle window cleaning method provided in the embodiments of this application, to detect and automatically clean a foreign object on a vehicle window; or use another device (such as a server or a mobile terminal) to implement the automatic vehicle window cleaning method provided in the embodiments of this application, to automatically clean a foreign object on a vehicle window after the foreign object is detected, so as to reduce a manual operation and improve security during vehicle traveling.

Figure 1:
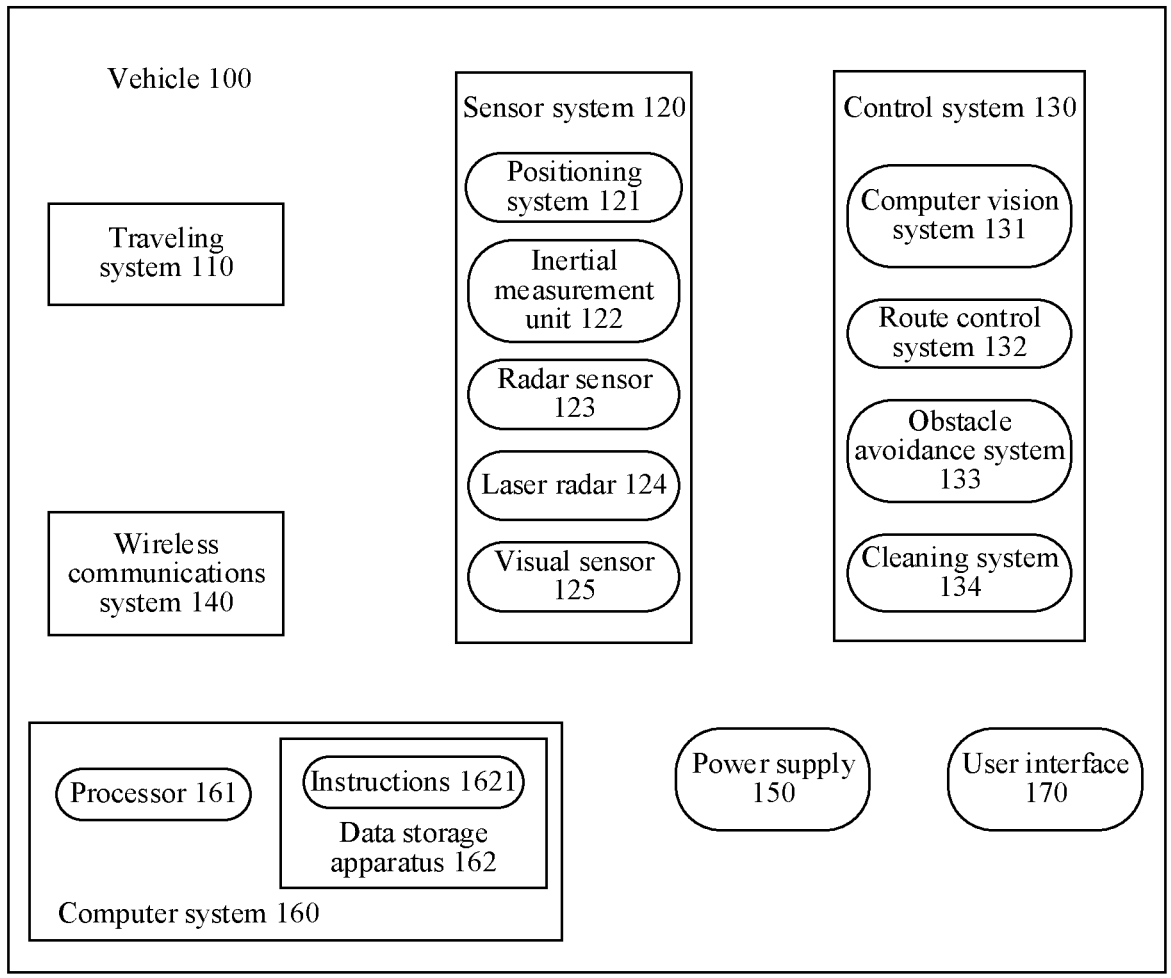
FIG. 1 is a first schematic structural diagram of a vehicle according to an embodiment of this application.

FIG. 1 is a functional block diagram of a vehicle 100 according to an embodiment of this application. In an embodiment, the vehicle 100 may determine, based on a vehicle window image collected by a camera in the vehicle, whether a foreign object exists on a vehicle window, so as to control a cleaning tool in the vehicle to automatically clean the vehicle window to remove the foreign object on the vehicle window.

The vehicle 100 may include various subsystems, such as a traveling system 110, a sensor system 120, a control system 130, a wireless communications system 140, a power supply 150, a computer system 160, and a user interface 170. Optionally, the vehicle 100 may include more or less subsystems, and each subsystem may include a plurality of elements. In addition, each subsystem and element of the vehicle 100 may be interconnected in a wired or wireless manner.

The traveling system 110 may include a component that provides power to the vehicle 100, such as an engine or a drive apparatus.

The sensor system 120 may include several sensors that sense information about an ambient environment of the vehicle 100. For example, the sensor system 120 may include at least one of a positioning system 121 (the positioning system may be a Global Positioning System (GPS) system, or may be a BeiDou system or another positioning system), an inertial measurement unit (IMU) 122, a radar sensor 123, a laser radar 124, a visual sensor 125, an ultrasonic sensor 126 (not shown in the figure), or a sonar sensor 127 (not shown in the figure). Optionally, the sensor system 120 may further include sensors (for example, an in-vehicle camera, an in-vehicle air quality monitor, a fuel gauge, and an engine oil temperature gauge) in an internal system of the monitored vehicle 100. One or more pieces of sensor data from these sensors may be used to detect an object and a corresponding feature (a location, a shape, a direction, a speed, or the like) of the object. Such detection and identification are key functions for ensuring a safe operation of the vehicle 100.

The positioning system 121 may be configured to estimate a geographical location of the vehicle 100. The IMU 122 is configured to sense, based on an inertial acceleration, a location of the vehicle 100 and a change of a direction that the vehicle 100 faces. In an embodiment, the IMU 122 may be a combination of an accelerometer and a gyroscope.

The radar sensor 123 may sense an object in a sounding environment of the vehicle 100 by using an electromagnetic wave signal. In some embodiments, in addition to sensing a location of an object, the radar sensor 123 may be further configured to sense a radial speed of the object and/or a radar scattering cross-sectional area (RCS) of the object.

The laser radar 124 may use a laser to sense an object in an environment in which the vehicle 100 is located. In some embodiments, the laser radar 124 may include one or more laser sources, laser scanners, one or more detectors, and another system component.

The visual sensor 125 may be configured to capture a plurality of images of the sounding environment of the vehicle 100 and a plurality of images of an internal vehicle environment. The plurality of images of the internal vehicle environment include a vehicle window image. The visual sensor 125 may be a static camera or a video camera.

The control system 130 may control operations of the vehicle 100 and the components of the vehicle 100. The control system 130 may include various elements, for example, at least one of a computer vision system 131, a route control system 132, an obstacle avoidance system 133, or a cleaning system 134.

The computer vision system 131 may operate to process and analyze an image captured by the visual sensor 125 and measurement data obtained by the radar sensor 123, to identify an object and/or a feature in the ambient environment of the vehicle 100 and a foreign object in the vehicle, such as a foreign object on a vehicle window. The object and/or the feature in the ambient environment of the vehicle 100 may include a traffic signal, a road boundary, and an obstacle. The computer vision system 131 may use an object identification algorithm, a structure from motion (SFM) algorithm, video tracking, and another computer vision technology. In some embodiments, the computer vision system 131 may be configured to: map an environment, track an object, estimate a speed of an object, and so on.

The route control system 132 is configured to determine a traveling route of the vehicle 100. In some embodiments, the route control system 132 may determine the traveling route for the vehicle 100 in combination with data from the radar sensor 123, the positioning system 121, and one or more predetermined maps.

The obstacle avoidance system 133 is configured to identify, evaluate, and avoid or bypass, in another manner, a potential obstacle in an environment of the vehicle 100.

The cleaning system 134 is configured to clean a foreign object on a vehicle window. The cleaning system 134 includes cleaning tools such as an air conditioner, a cleaning liquid sprayer, and a windshield wiper. In this embodiment of this application, the cleaning system 134 may clean the foreign object existing on the vehicle window in combination with vehicle window image information from the visual sensor 125, so as to improve security of a driver in a vehicle traveling process.

Certainly, in an instance, the control system 130 may include, through addition or replacement, a component other than those shown and described; or some of the components shown above may be reduced.

The vehicle 100 may obtain information by using the wireless communications system 140. The wireless communications system 140 may wirelessly communicate with one or more devices directly or by using a communications network. For example, the wireless communications system 140 may use third generation (3G) cellular communication such as code-division multiple access (CDMA), Evolution-Data Optimized (EVDO), or Global System for Mobile Communications (GSM)/General Packet Radio Service (GPRS), fourth generation (4G) cellular communication such as Long-Term Evolution (LTE), or fifth generation (5G) cellular communication. The wireless communications system 140 may communicate with a wireless local area network (WLAN) using WIFI. In some embodiments, the wireless communications system 140 may directly communicate with a device through an infrared link, BLUETOOTH, or ZIGBEE; or other wireless protocols, such as various vehicle communications systems. For example, the wireless communications system 140 may include one or more dedicated short range communications (DSRC) devices.

Some or all of functions of the vehicle 100 are controlled by the computer system 160. The computer system 160 may include at least one processor 161. The processor 161 executes an instruction 1621 stored in a non-transient computer-readable medium such as a data storage apparatus 162. The computer system 160 may be a plurality of computing devices that control an individual component or a subsystem of the vehicle 100 in a distributed manner.

The processor 161 may be any conventional processor, such as a commercially available central processing unit (CPU). Alternatively, the processor may be a dedicated device such as an application-specific integrated circuit (ASIC) or another hardware-based processor. Although FIG. 1 functionally shows a processor, a memory, and other elements in a same physical housing, a person of ordinary skill in the art should understand that the processor, the computer system, or the memory may actually include a plurality of processors, computer systems, or memories that can be stored in a same physical housing, or include a plurality of processors, computer systems, or memories that can be stored in different physical housings. For example, the memory may be a hard disk drive or another storage medium located in a different physical housing. Therefore, reference to the processor or the computer system is understood as including reference to a set of processors, computer systems, or memories that can be operated in parallel, or reference to a set of processors, computer systems, or memories that can be operated not in parallel. Unlike using a single processor to perform the step described herein, some components, such as a steering component and a deceleration component, may all have respective processors, and the processor performs only calculation related to a component-specific function.

In the aspects described herein, the processor may be located far away from the vehicle and wirelessly communicate with the vehicle. In another aspect, some operations in the process described herein are performed on a processor disposed in the vehicle, and the other operations are performed by a remote processor, including performing a step for performing a single operation.

Optionally, the foregoing components are merely examples. In actual application, the component in each of the modules may be added or deleted based on an actual requirement. FIG. 1 should not be understood as a limitation on this embodiment of this application.

An automobile traveling on a road, such as the vehicle 100, may identify a foreign object on a vehicle window, and determine a corresponding cleaning policy, so that the vehicle can automatically clean the vehicle window. In some examples, each identified foreign object may be considered independently, and an automatic vehicle window cleaning policy may be determined for the automobile in traveling based on respective features of the foreign objects, such as a shape and an area, a traveling status (such as a speed) of the vehicle, and a status of a driver (for example, whether the driver is fatigued).

Optionally, the vehicle 100 or a computing device (such as the computer system 160, the computer vision system 131, and the data storage apparatus 162 in FIG. 1) associated with the vehicle 100 may detect and identify a foreign object on a vehicle window based on an obtained vehicle window image. The vehicle 100 can adjust a cleaning policy of the vehicle 100 based on a predicted foreign object on the vehicle window, a traveling status of the vehicle and a driver status. In other words, the vehicle can determine, based on the predicted foreign object, how long and how often that the cleaning tool in the vehicle needs to work. In this process, another factor may also be considered to determine an automatic vehicle window cleaning policy of the vehicle 100, such as a status of a vehicle around the vehicle 100 or a weather condition in a traveling process.

In addition to providing a function or a feature of identifying the foreign object on the vehicle window to determine the automatic vehicle window cleaning policy of the automobile in traveling, the computing device may further provide an instruction of the vehicle 100 for indicating to automatically clean the foreign object on the vehicle window, so that the automobile in the traveling process automatically cleans the foreign object on the vehicle window of the vehicle (for example, the air conditioner blowing hot air/cold air, spraying cleaning liquid, and waving the windshield wiper) while ensuring security, to keep the vehicle window clean.

The vehicle 100 may be a car, a truck, a motorcycle, a bus, a boat, an airplane, a helicopter, a recreational vehicle, a construction device, a trolley, a golf cart, a train, or the like. This is not limited in this embodiment of this application.

Figure 2:
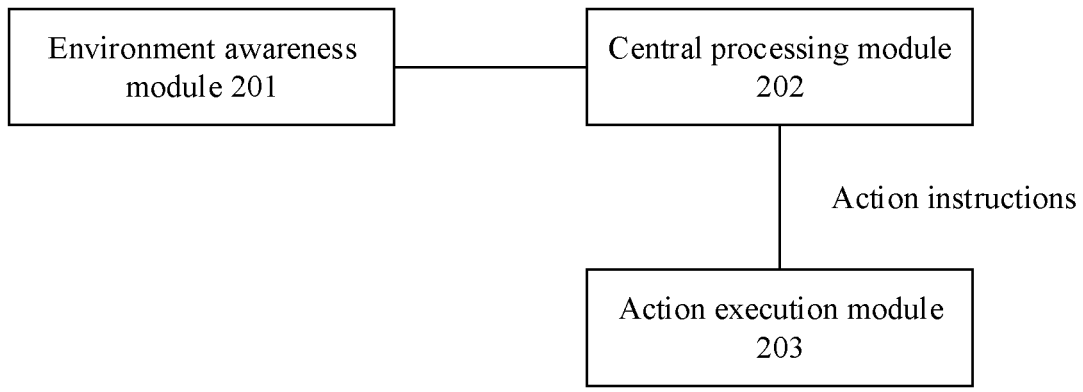
FIG. 2 is a second schematic structural diagram of a vehicle according to an embodiment of this application.

Referring to FIG. 2, for example, a vehicle may include the following modules an environment awareness module 201, central processing module 202, and action execution module 203, a vehicle-mounted communications module 204, the storage component 205.

The environment awareness module 201 is configured to obtain a vehicle window image photographed by a camera in the vehicle; determine, in combination with the vehicle window image, whether a foreign object exists on a vehicle window, including a first-type foreign object and a second-type foreign object; and determine a location of the second-type foreign object. In addition, the environment awareness module 201 includes at least detection apparatuses such as a temperature sensor and a camera. Information such as the vehicle window image and a vehicle window video are obtained in real time by using the camera in the vehicle, information such as temperature data inside and outside the vehicle is obtained in real time by using the temperature sensor, and the obtained information is transmitted to the central processing module 202, so that the central processing module 202 generates a corresponding automatic vehicle window cleaning policy.

The central processing module 202 (such as a vehicle-mounted computer) is configured to receive information such as the vehicle window image, the vehicle window video, and the temperature data inside and outside the vehicle from the environment awareness module 201. The central processing module 202 detects and analyzes, in combination with a current traveling status (such as a speed) of the vehicle and a status of a driver (for example, whether the driver is fatigued or whether the driver is distracted) that are stored in the central processing module 202, the vehicle window image and the vehicle window video that are received from the environment awareness module 201; determines that the first-type foreign object and the second-type foreign object both exist or either of the first-type foreign object and the second-type foreign object exists on the vehicle window; generates a corresponding cleaning decision (for example, working duration and a working frequency of a windshield wiper); outputs an action instruction corresponding to the cleaning decision; and sends the action instruction to an action execution module 203, to indicate the action execution module 203 to automatically clean the vehicle window based on the action instruction.

The action execution module 203 is configured to receive the action instruction from the central processing module 202, and complete an automatic vehicle window cleaning operation based on the action instruction. The action execution module includes at least cleaning tools in the vehicle, such as a windshield wiper, an air conditioner, and a cleaning liquid sprayer.

The vehicle-mounted communications module 204 (not shown in FIG. 2) is configured to exchange information between the vehicle and another vehicle.

The storage component 205 (not shown in FIG. 2) is configured to store executable code of the foregoing modules. Some or all of method procedures in the embodiments of this application may be implemented by running the executable code.

Figure 3:
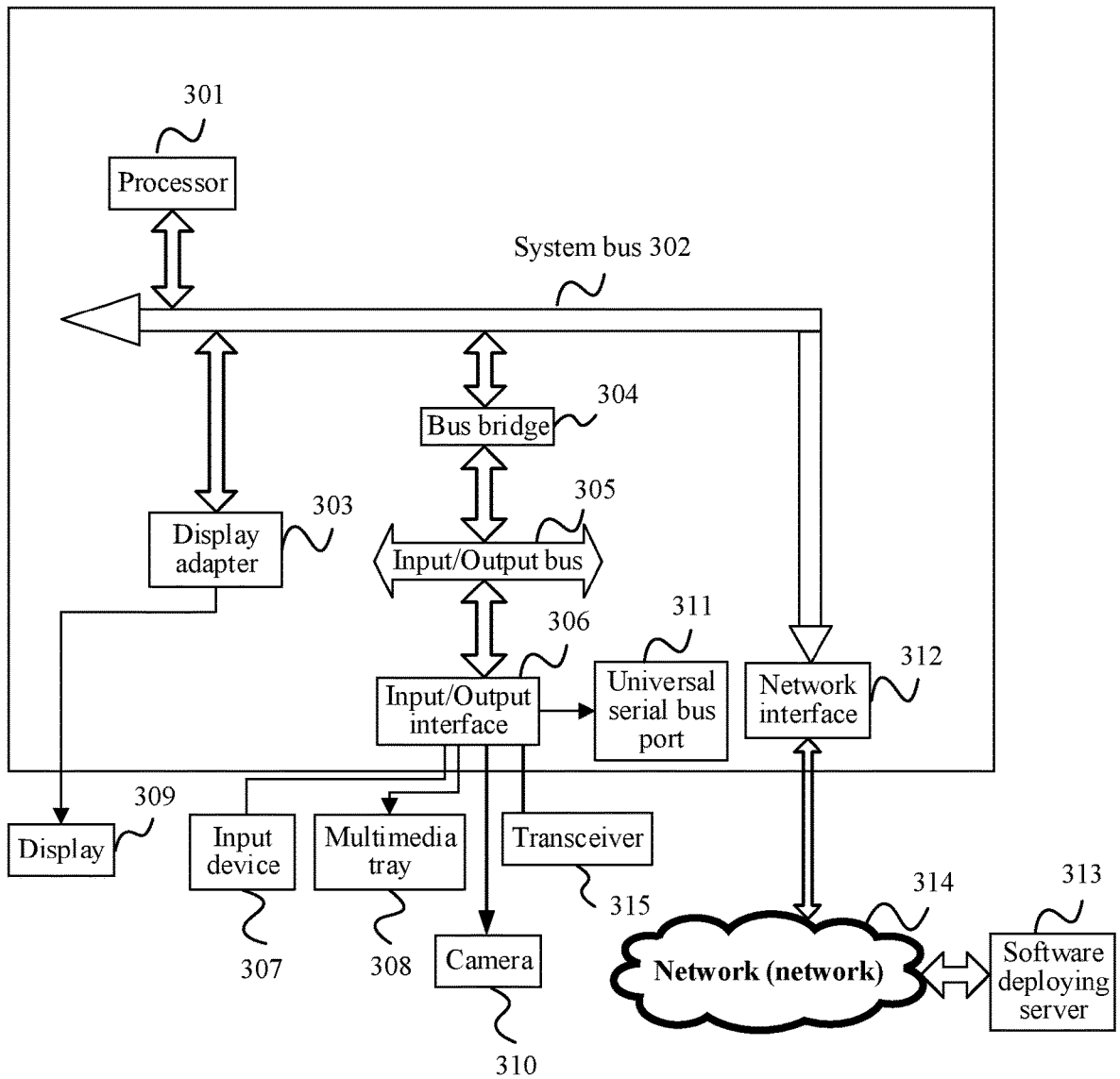
FIG. 3 is a schematic structural diagram of a computer system according to an embodiment of this application.

In a possible implementation of this embodiment of this application, as shown in FIG. 3, the computer system 160 shown in FIG. 1 includes a processor 301, and the processor 301 is coupled to a system bus 302. There may be one or more processors 301, and each processor may include one or more processor cores. The computer system 160 further includes a display adapter (video adapter) 303. The display adapter 303 may drive a display 309, and the display 309 is coupled to the system bus 302. The system bus 302 is coupled to an input/output (I/O) bus 305 by using a bus bridge 304. An I/O interface 306 is coupled to the I/O bus 305. The I/O interface 306 communicates with a plurality of I/O devices, such as an input device 307 (such as a keyboard, a mouse, or a touchscreen), a multimedia tray (media tray) 308 (such as a compact disc read-only memory (CD-ROM) or a multimedia interface), a transceiver 315 (which may send and/or receive a radio communication signal), a camera 310 (which may capture static and dynamic digital video images), and an external universal serial bus (USB) interface 311. Optionally, an interface connected to the I/O interface 306 may be a USB interface.

The processor 301 may be any conventional processor, including a reduced instruction set computer (RISC), a complex instruction set computer (CISC), or a combination thereof. Optionally, the processor may be a dedicated apparatus such as an ASIC. Optionally, the processor 301 may be a neural-network processing unit or a combination of a neural-network processing unit and the conventional processor.

Optionally, in various embodiments described in this specification, the computer system 160 may be located at a place far away from the vehicle and may wirelessly communicate with the vehicle 100. In another aspect, some processes described in this specification are performed on a processor disposed in the vehicle, and the other processes are performed by a remote processor, including performing an action for performing a single operation.

The computer system 160 may communicate with a software deploying server 313 by using a network interface 312. The network interface 312 is a hardware network interface, such as a network adapter. A network 314 may be an external network, such as the Internet; or may be an internal network, such as an Ethernet or a virtual private network (VPN). Optionally, the network 314 may be a wireless network, such as a WIFI network or a cellular network.

In some other embodiments of this application, the automatic vehicle window cleaning method in the embodiments of this application may be further performed by a chip system. An embodiment of this application provides a chip system. A host CPU and a neural-network processing unit (NPU) may cooperate to implement a corresponding algorithm of a function required by the vehicle 100 in FIG. 1, or implement a corresponding algorithm of a function required by the vehicle shown in FIG. 2, or implement a corresponding algorithm of a function required by the computer system 160 shown in FIG. 3.

In some other embodiments of this application, the computer system 160 may further receive information from another computer system or transfer information to another computer system. Alternatively, sensor data collected from the sensor system 120 of the vehicle 100 may be transferred to another computer, and the other computer processes the data. Data from the computer system 160 may be transferred to a cloud-side computer system by using a network for further processing. The network and an intermediate node may include various configurations and protocols, including the Internet, a World Wide Web, the Intranet, a virtual private network, a wide region network, a local region network, a dedicated network using a dedicated communication protocol of one or more companies, an Ethernet, WIFI, Hypertext Transfer Protocol (HTTP), and various combinations thereof. Such communication may be performed by any device capable of transmitting data to another computer and receiving data from another computer, such as a modem and a wireless interface.

The automatic vehicle window cleaning method provided in the embodiments of this application is applied to a vehicle window cleaning scenario, and may be performed by a control chip, a processor, or the like in a vehicle, for example, the processor 161 in FIG. 1 or the processor 301 in FIG. 3. In addition, the automatic vehicle window cleaning method provided in the embodiments of this application may also be performed by another device that has a vehicle window cleaning function, for example, may be performed by a cloud server. The automatic vehicle window cleaning method in the embodiments of this application is described below in detail with reference to the accompanying drawings.

To automatically clean a vehicle window, this application provides an automatic vehicle window cleaning method. The method includes the following steps S401 to S405. An embodiment of this application is described below with reference to FIG. 4 and FIG. 5.

S401. Obtain a vehicle window image.

A vehicle window in this embodiment of this application includes a front windshield, a rear windshield, and a side vehicle window. Correspondingly, the vehicle window image refers to a front windshield image of a vehicle and/or a rear windshield image of the vehicle. Optionally, the vehicle window image may be a side vehicle window image of the vehicle. The vehicle window image includes no other part of a vehicle body.

Optionally, the vehicle window image is obtained through photographing by a camera in the vehicle. There may be one or more cameras in the vehicle. The camera needs to be disposed at a location at which the vehicle window image can be obtained.

Figure 5:
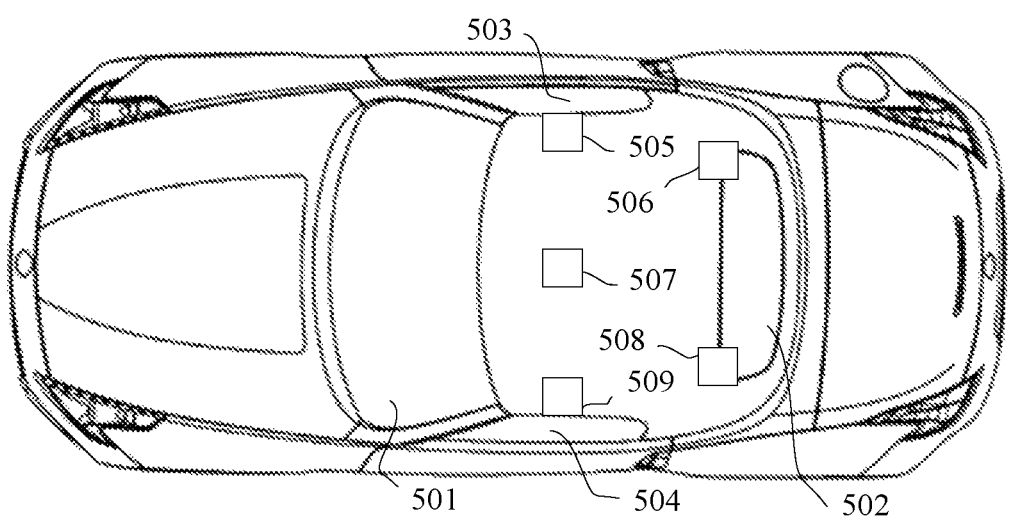
FIG. 5 is a schematic diagram of a location at which a camera is installed in a vehicle according to an embodiment of this application.

For example, as shown in FIG. 5, a region 501 represents the front windshield of the vehicle, a region 502 represents the rear windshield of the vehicle, and a region 503 and a region 504 represent side vehicle windows of the vehicle. The in-vehicle camera may be disposed at a location, such as locations shown by 506 and 508, at which the rear windshield of the vehicle is connected to an inner roof of the vehicle. The camera can obtain the rear windshield image of the vehicle at this location. The in-vehicle camera may alternatively be disposed at a location, such as locations shown by 505 and 509, at which the side vehicle window of the vehicle is connected to the inner roof of the vehicle. The camera can obtain the front windshield image of the vehicle, the rear windshield image of the vehicle, and the side vehicle window image of the vehicle at this location. The in-vehicle camera may alternatively be disposed on the inner roof of the vehicle, such as a location shown by 507. The camera can obtain the front windshield image of the vehicle, the rear windshield image of the vehicle, or the side vehicle window image of the vehicle at this location. In addition, it should be noted that a location of the in-vehicle camera may be determined based on a requirement, and is not limited to the location shown in FIG. 5. For example, the camera may be disposed at a location at which the front windshield of the vehicle is connected to the inner roof of the vehicle. The camera can obtain the front windshield image of the vehicle at this location.

Optionally, to automatically clean a foreign object when it is detected that the foreign object exists on the front windshield, so as to reduce obscuring of a driver's line-of-sight by the foreign object on the front windshield, and improve security in a vehicle traveling process, the in-vehicle camera needs to be disposed at least at a location at which the front windshield of the vehicle (for example, a front windshield on a driver side of the vehicle) can be photographed in the vehicle. In this way, in the vehicle traveling process, the camera may photograph the front windshield image of the vehicle in real time, so as to detect, in real time, whether any foreign object exists on the front windshield.

In this step, when the vehicle window image is obtained, a single frame of vehicle window image may be obtained by performing photographing a single time, or a plurality of frames of vehicle window images may be obtained by performing photographing a plurality of consecutive times. Referring to the following S402 and S403, in this embodiment of this application, whether a first-type foreign object such as fog or frost exists on a vehicle window may be detected based on a single frame of vehicle window image. Referring to the following S404, in this embodiment of this application, whether a second-type foreign object such as dust or a falling leaf exists on the vehicle window may be detected based on a plurality of frames of vehicle window images.

S402. Determine a dark channel image corresponding to a single frame of vehicle window image.

The single frame of vehicle window image is obtained by the camera by performing photographing a single time in step S401, or may be a last frame of vehicle window image in the plurality of frames of vehicle window images obtained by the camera by performing photographing a plurality of consecutive times in step S401, or may be any frame of vehicle window image in the plurality of frames of vehicle window images obtained by the camera by performing photographing a plurality of consecutive times in step S401. The dark channel image is a gray value image of the single frame of vehicle window image. Compared with the single frame of vehicle window image, the gray value image of the single frame of vehicle window image can more clearly reflect whether fog exists on the vehicle window. Therefore, in this embodiment of this application, the dark channel image of the single frame of vehicle window image is used to detect whether fog exists on the vehicle window. Pixels in the dark channel image are in a one-to-one correspondence with pixels in the single frame of vehicle window image, and a value of each pixel in the dark channel image is obtained through calculation based on a value of a pixel at a same corresponding location in the single frame of vehicle window image.

Any pixel x in the vehicle window image is used as an example. A gray value of the pixel x is determined through calculation based on an RGB value of the pixel x in the single frame of vehicle window image and a dark channel model $$J_{dark} = \min_{x \in w} \left( \min_{c \in \{r,g,b\}} I^c(x) \right).$$

A value range of the gray value of the pixel is from 0 to 255. I represents the single frame of vehicle window image; c represents a color channel of the pixel, including an r channel, a g channel, and a b channel, that is, a red channel, a green channel, and a blue channel; $I^c(x)$ represents a value of the pixel x on each of the three color channels (the r channel, the g channel, and the b channel); w is a pixel set in a pixel region with a size of a×a that is in the single frame of vehicle window image and that uses the pixel x as a center; and a is an integer greater than 0, a value of a may be determined based on an actual requirement, and a relatively common value of a is 1, 3, 5, 7, or the like. $J_{dark}$ represents the gray value of the pixel x, and a value of $J_{dark}$ is a minimum value of a pixel in w on the color channel (including the three color channels R, G, and B).

For example, the single frame of vehicle window image includes 5×5 pixels, the pixel x is a pixel in a third row and a third column in the single frame of vehicle window image, and w is a pixel set in a pixel region with a size of 3×3 that is in the single frame of vehicle window image and that uses the pixel x as a center. In this case, the pixel set w includes pixels in a second row and a second column, a second row and a third column, a second row and a fourth column, a third row and a second column, a third row and a third column, a third row and a fourth column, a fourth row and a second column, a fourth row and a third column, and a fourth row and a fourth column in the single frame of vehicle window image. RGB values of these pixels are respectively (255, 146, 85), (254, 150, 90), (240, 165, 100), (244, 163, 98), (240, 159, 95), (248, 160, 99), (249, 159, 89), (239, 149, 85), and (245, 157, 99). Based on the dark channel model, it is determined that a minimum value of the 3×3 pixels in w on the three color channels (the R channel, the G channel, and the B channel) is 85. Therefore, the gray value of the to-be-processed pixel x is 85, that is, an RGB value of a pixel that corresponds to the pixel x and that is in the dark channel image is (85, 85, 85).

For an edge pixel x in the single frame of vehicle window image, a quantity of pixels in a pixel set w in a pixel region with a size of a×a that uses the edge pixel x as a center is less than or equal to a×a.

For example, the single frame of vehicle window image includes 5×5 pixels, the pixel x is a pixel in a fifth row and a fifth column in the single frame of vehicle window image, and w is a pixel set in a pixel region with a size of 3×3 that is in the single frame of vehicle window image and that uses the pixel x as a center. In this case, the pixel set w includes pixels in a fourth row and a fourth column, a fourth row and a fifth column, a fifth row and a fourth column, and a fifth row and a fifth column in the single frame of vehicle window image. RGB values of these pixels are respectively (245, 157, 99), (255, 159, 90), (244, 163, 95), and (254, 165, 89). Based on the dark channel model, it is determined that a minimum value of the four pixels in w on the three color channels (the r channel, the g channel, and the b channel) is 89. Therefore, the gray value of the to-be-processed pixel x is 89, that is, an RGB value of a pixel that corresponds to the pixel x and that is in the dark channel image is (89, 89, 89).

S403. Determine, based on a quantity of pixels whose gray values exceed a preset gray threshold in the dark channel image and/or definition of the dark channel image, that a first-type foreign object exists on a vehicle window.

For example, the first-type foreign object is a foreign object such as fog or frost.

That the first-type foreign object exists on the vehicle window may be determined based on the quantity of pixels whose gray values exceed the preset gray threshold in the dark channel image, or may be determined based on the definition of the dark channel image, or may be determined in combination with the two factors. Therefore, there are three methods for determining that the first-type foreign object exists on the vehicle window, as shown in the following (1) to (3).

(1) It is determined, based on the quantity of pixels whose gray values exceed the preset gray threshold in the dark channel image, that the first-type foreign object exists on the vehicle window. If a quantity of pixels whose gray values each do not exceed the preset gray threshold in the dark channel image is less than or equal to the quantity of pixels whose gray values exceed the preset gray threshold in the dark channel image, it is determined that the first-type foreign object exists on the vehicle window.

For example, if a single frame of vehicle window image includes 10×10 pixels, a dark channel image corresponding to the single frame of vehicle window image is a gray value image of the single frame of vehicle window image, the dark channel image includes 10×10 pixels that correspond to the pixels in the single frame of vehicle window image, and a value range of a gray value of the pixel is from 0 to 255. If the preset gray threshold is 100, a quantity of pixels whose gray values each do not exceed the preset gray threshold in the dark channel image is 30, and a quantity of pixels whose gray values exceed the preset gray threshold is 70, the first-type foreign object exists on the vehicle window because 30<70. Alternatively, if the preset gray threshold is 100, a quantity of pixels whose gray values each do not exceed the preset gray threshold in the dark channel image is 50, and a quantity of pixels whose gray values exceed the preset gray threshold is 50, the first-type foreign object exists on the vehicle window. Alternatively, if the preset gray threshold is 100, a quantity of pixels whose gray values each do not exceed the preset gray threshold in the dark channel image is 70, and a quantity of pixels whose gray values exceed the preset gray threshold is 30, no first-type foreign object exists on the vehicle window because 70>30.

For example, if a single frame of vehicle window image includes 10×10 pixels, a dark channel image corresponding to the single frame of vehicle window image is a gray value image of the single frame of vehicle window image, the dark channel image includes a gray image having 10×10 pixels that correspond to the pixels in the single frame of vehicle window image, and a value range of a gray value of the pixel is from 0 to 255. A gray value histogram of the dark channel image is established by using the gray value of the pixel as a horizontal coordinate and a quantity of pixels with a same gray value as a vertical coordinate. Count a quantity sum 1 of pixels whose gray values fall within the first third of the value range of the gray value (that is, the gray value ranges from 0 to 85) and a quantity sum 2 of pixels whose gray values fall within the last two thirds of the value range of the gray value (that is, the gray value ranges from 86 to 255). If sum 1<=sum 2, the first-type foreign object exists on the vehicle window, or if sum 1>sum 2, no first-type foreign object exists on the vehicle window. It should be noted that, this embodiment of this application has a better effect when one third is used. However, this is not limited to one third, and may be determined based on an actual situation.

(2) It is determined, based on the definition of the dark channel image, that the first-type foreign object exists on the vehicle window. If the definition of the dark channel image is lower than preset definition, it is determined that the first-type foreign object exists on the vehicle window.

Optionally, the definition of the dark channel image is a variance of gray values of pixels in the dark channel image.

For example, if a single frame of vehicle window image includes 2×2 pixels, a dark channel image corresponding to the single frame of vehicle window image is a gray image including 2×2 pixels (the 2×2 pixels are respectively A, B, C, and D), and a value range of a gray value of the pixel is from 0 to 255. In the dark channel image, a gray value of the pixel A is 7, a gray value of the pixel B is 1, a gray value of the pixel C is 3, a gray value of the pixel D is 5, and an average value of the gray values of the pixels A, B, C, and D is 4. In this case, the definition of the dark channel image (that is, a variance of the gray values of the pixels in the dark channel image) is $[(7-4)^2+(1-4)^2+(3-4)^2+(5-4)^2]/4=5$. If the preset definition is 6, the first-type foreign object exists on the vehicle window; if the preset definition is 5, no first-type foreign object exists on the vehicle window; or if the preset definition is 4, no first-type foreign object exists on the vehicle window.

Optionally, the definition of the dark channel image is determined based on an information entropy of the pixel in the dark channel image. The information entropy of the dark channel image is determined by using $H=-\Sigma_{d=1}^{n} p_d \log(p_d)$. H is the information entropy of the dark channel image, d represents the gray value of the pixel, n represents a maximum value of the gray value of the pixel, and pd represents a probability that a pixel whose gray value is d appears in the dark channel image. The information entropy of the dark channel image may indicate gray distribution in the image. A larger information entropy of the dark channel image indicates a larger change range of the gray value of the pixel in the dark channel image, and higher definition of the image. A smaller information entropy of the dark channel image indicates a smaller change range of the gray value of the pixel in the dark channel image, and lower definition of the image. If the information entropy of the dark channel image is less than a preset information entropy threshold, the first-type foreign object exists on the vehicle window; or if the information entropy of the dark channel image is not less than the preset information entropy threshold, no first-type foreign object exists on the vehicle window.

Optionally, the definition of the dark channel image is saturation of the dark channel image obtained through calculation by using a hue, saturation, value (HSV) color model. Higher saturation of the dark channel image indicates higher definition of the dark channel image, and lower saturation of the dark channel image indicates lower definition of the dark channel image. If the saturation of the dark channel image is less than a preset saturation threshold, the first-type foreign object exists on the vehicle window, or if the saturation of the dark channel image is not less than the preset saturation threshold, no first-type foreign object exists on the vehicle window.

It should be noted that a measurement manner used to determine or represent definition of an image is not limited to the information entropy and the saturation provided in this embodiment of this application. A hue and a value in the HSV color model may also be used to determine or represent the definition of the image, and a specific measurement manner of the definition of the image may be determined based on actual application.

(3) It is determined, based on the quantity of pixels whose gray values exceed the preset gray threshold in the dark channel image and/or the definition of the dark channel image, that the first-type foreign object exists on the vehicle window.

If a quantity of pixels whose gray values each do not exceed the preset gray threshold in the dark channel image is less than or equal to the quantity of pixels whose gray values exceed the preset gray threshold in the dark channel image, and the definition of the dark channel image is lower than preset definition, it is determined that the first-type foreign object exists on the vehicle window.

For example, the definition of the dark channel image is a variance of RGB values of pixels in the dark channel image. If a single frame of vehicle window image includes 2×2 pixels, a dark channel image corresponding to the single frame of vehicle window image is a gray image including 2×2 pixels (the 2×2 pixels are respectively A, B, C, and D), and a value range of a gray value of the pixel is from 0 to 255. In the dark channel image, a gray value of the pixel A is 7, a gray value of the pixel B is 1, a gray value of the pixel C is 3, and a gray value of the pixel D is 5. In this case, the definition of the dark channel image (that is, a variance of the gray values of the pixels in the dark channel image) is $[(7-4)2+(1-4)2+(3-4)2+(5-4)2]/4=5$. If the preset gray threshold is 2, and the preset definition is 6, the gray value of the pixel B does not exceed the preset gray threshold, the gray values of the pixels A, C, and D exceed the preset gray threshold, 1<3, and the definition of the dark channel image is 5<6. In this case, the first-type foreign object exists on the vehicle window. Alternatively, if the preset gray threshold is 3, and the preset definition is 6, the gray values of the pixels B and C do not exceed the preset gray threshold, the gray values of the pixels A and D exceed the preset gray threshold, 2=2, and the definition of the dark channel image is 5<6. In this case, the first-type foreign object exists on the vehicle window. Alternatively, if the preset gray threshold is 2, and the preset definition is 4, the gray value of the pixel B does not exceed the preset gray threshold, the gray values of the pixels A, C, and D exceed the preset gray threshold, 1<3, and the definition of the dark channel image is 5>4. In this case, no first-type foreign object exists on the vehicle window. Alternatively, if the preset gray threshold is 5, and the preset definition is 6, the gray values of the pixels B, C, and D do not exceed the preset gray threshold, the gray value of the pixel A exceeds the preset gray threshold, 3>1, and the definition of the dark channel image is 5<6. In this case, no first-type foreign object exists on the vehicle window. Alternatively, if the preset gray threshold is 5, and the preset definition is 4, the gray values of the pixels B, C, and D do not exceed the preset gray threshold, the gray value of the pixel A exceeds the preset gray threshold, 3>1, and the definition of the dark channel image is 5>4. In this case, no first-type foreign object exists on the vehicle window.

S404. Determine, based on RGB values of pixels in i consecutive frames of vehicle window images, that a second-type foreign object exists on the vehicle window.

The i consecutive frames of vehicle window images are some of the plurality of frames of vehicle window images obtained by the camera by performing photographing a plurality of times in step S401, and i is an integer greater than 1.

Optionally, the second-type foreign object may be a foreign object such as dust, a falling leaf, or a bird's droppings.

It is first determined, based on the RGB values of the pixels in the i consecutive frames of vehicle window images, that is, values that are of the pixels in the i consecutive frames of vehicle window images and that are on the three color channels r, g, and b, a change of an RGB value of a pixel at same a location in the i consecutive frames of vehicle window images, to establish an image background model. A pixel in the image background model represents a change of an RGB value of a pixel in the i consecutive frames of vehicle window images. In an example, if the RGB value of the pixel at the same location in the i consecutive frames of vehicle window images does not change, an RGB value of a pixel that is in the image background model and that corresponds to the pixel that does not change in the i consecutive frames of vehicle window images is (0, 0, 0). Alternatively, if the RGB value of the pixel at the same location in the i consecutive frames of vehicle window images changes, an RGB value of a pixel that is in the image background model and that corresponds to the pixel that changes in the i consecutive frames of vehicle window images is an RGB value other than (0, 0, 0). Usually, in a vehicle traveling process, if a foreign object such as a falling leaf exists on the vehicle window, a picture (a pixel value) of a location on the vehicle window other than a location at which the falling leaf exists changes with traveling of the vehicle, and a picture (a pixel value) of the location at which the falling leaf exists on the vehicle window does not change or changes to a relatively small degree with traveling of the vehicle. Therefore, based on the RGB value of the pixel in the image background model, it may be determined that a vehicle window region corresponding to a pixel whose RGB value does not change in the i consecutive frames of vehicle window images or a pixel whose RGB value changes to a degree not exceeding a preset threshold in the i consecutive frames of vehicle window images is a first region, and that the second-type foreign object exists in the first region.

For example, each frame of vehicle window image includes 2×2 pixels, and i=3. In the three consecutive frames of vehicle window images, a first frame of vehicle window image includes pixels A1, B1, C1, and D1, and RGB values of the four pixels are respectively (1, 2, 3), (3, 5, 6), (1, 9, 5), and (2, 3, 0); a second frame of vehicle window image includes pixels A2, B2, C2, and D2, and RGB values of the four pixels are respectively (3, 2, 5), (7, 5, 2), (7, 1, 9), and (8, 5, 2); and a third frame of vehicle window image includes pixels A3, B3, C3, and D3, and RGB values of the four pixels are respectively (3, 2, 1), (5, 5, 4), (5, 1, 7), and (6, 3, 2). A difference between RGB values of pixels at a same location in every two of the three frames of vehicle window image is calculated, and it is determined that an average value of the obtained differences is an RGB value of a pixel at a corresponding location in the image background model. Therefore, RGB values of pixels A4, B4, C4, and D4 in the image background model are respectively (4/3, 0, 8/3), (8/3, 0, 8/3), (4, 16/3, 8/3), and (4, 4/3, 4/3). If a preset change threshold is 9, for the pixels A4, B4, C4, and D4 in the image background model corresponding to the three consecutive frames of vehicle window images, 4/3+8/3<9, 8/3+8/3<9, 4+16/3+8/3>9, and 4+4/3+4/3<9, that is, RGB values of pixels that are in the three consecutive frames of vehicle window images and that correspond to the pixels A4, B4, and D4 in the image background model change, but a degree of the change does not exceed the preset change threshold 9. In this case, a vehicle window region corresponding to the pixels A4, B4, and D4 in the image background model is the first region, that is, a vehicle window region corresponding to the pixels A1, B1, and D1 (or the pixels A2, B2, and D2; or the pixels A3, B3, and D3) in the three consecutive frames of vehicle window images is the first region. The second-type foreign object exists in the first region.

Optionally, when the image background model is established by using the RGB values of the pixels in the i consecutive frames of vehicle window images, an average value of RGB values of pixels at a same location in the i consecutive frames of vehicle window images is first determined, and then an average value image corresponding to the i consecutive frames of vehicle window images is determined based on a calculated average value of RGB values of pixels at each location in the i consecutive frames of vehicle window images. The image background model is established based on a difference between an RGB value of a pixel in the average value image and an RGB value of a pixel at a same location in an ith frame of vehicle window image.

For example, each frame of vehicle window image includes 2×2 pixels, and i=2. In the two consecutive frames of vehicle window images, a first frame of vehicle window image includes pixels A1, B1, C1, and D1, and RGB values of the four pixels are respectively (1, 2, 3), (3, 5, 6), (1, 9, 5), and (2, 3, 0); and a second frame of vehicle window image includes pixels A2, B2, C2, and D2, and RGB values of the four pixels are respectively (3, 2, 5), (7, 5, 2), (7, 1, 9), and (8, 5, 2). It is determined, based on RGB values of pixels at a same location in the two consecutive frames of vehicle window images, that RGB values of pixels A3, B3, C3, and D3 in the average value image are respectively (2, 2, 4), (5, 5, 4), (4, 5, 7), and (5, 4, 1), and differences between the RGB values of the pixels in the average value image and the RGB values of the pixels in the second frame of vehicle window image are respectively (1, 0, 1), (2, 0, 2), (3, 4, 2), and (3, 1, 1). In this case, the image background model is obtained based on the two consecutive frames of vehicle window images, and RGB values of pixels A4, B4, C4, and D4 in the image background model are respectively (1, 0, 1), (2, 0, 2), (3, 4, 2), and (3, 1, 1).

Optionally, when the first region is determined based on the RGB value of the pixel in the image background model, the change of the RGB value of the pixel at the same location in the i consecutive frames of vehicle window images is determined based on the RGB value of the pixel in the image background model and a first preset algorithm, and it is further determined that a vehicle window region corresponding to a pixel whose RGB value does not change in the i consecutive frames of vehicle window images is the first region, and that the second-type foreign object exists in the first region. The first preset algorithm is a saliency detection algorithm or a target detection algorithm.

For example, i=2, and each frame of vehicle window image includes 2×2 pixels. In the two consecutive frames of vehicle window images, a first frame of vehicle window image includes pixels A1, B1, C1, and D1, a second frame of vehicle window image includes pixels A2, B2, C2, and D2, and an image background model corresponding to the two consecutive frames of vehicle window images includes pixels A3, B3, C3, and D3. It is determined, based on the saliency detection algorithm or the target detection algorithm, that RGB values of the pixels C1 and D1 and C2 and D2 that are in the two consecutive frames of vehicle window images and that correspond to the pixels C3 and D3 in the image background model do not change. Therefore, a vehicle window region corresponding to the pixels C3 and D3 in the image background model is the first region, that is, a vehicle window region corresponding to the pixels C1 and D1 and that corresponding to C2 and D2 in the two consecutive frames of vehicle window images are first regions. The second-type foreign object exists in the first region.

It should be noted that step S402 and step S403 are used to detect the first-type foreign object on the vehicle window, and step S404 is used to detect whether the second-type foreign object exists on the vehicle window. A sequence of detecting whether the first-type foreign object exists on the vehicle window and detecting whether the second-type foreign object exists on the vehicle window is not limited. In an example, step S402 and step S403 may be first performed and then step S404 is performed; or step S404 may be first performed and then step S402 and step S403 are performed; or step S402 and step S403 and step S404 may be simultaneously performed.

S405. Control a cleaning tool to remove a foreign object.

The cleaning tool includes a first cleaning tool and a second cleaning tool. The first cleaning tool, such as an air conditioner, is mainly used to remove the first-type foreign object by performing an operation such as dehumidification or temperature adjustment. The second cleaning tool, such as a windshield wiper, is mainly used to remove the second-type foreign object attached to a vehicle windshield, such as a rain point and dust, so as to improve visibility of a driver. Implementations of removing the first-type foreign object and the second-type foreign object are separately described below.

(1) The cleaning tool is controlled to remove the first-type foreign object.

Optionally, the first cleaning tool is controlled based on temperature data inside and outside the vehicle to be enabled for preset duration, to remove the first-type foreign object. The preset duration may be determined based on the temperature data inside and outside the vehicle, or may be determined by the driver.

For example, the first cleaning tool is an air conditioner, and the first-type foreign object is fog. If a temperature T1 inside the vehicle is greater than a temperature T2 outside the vehicle, it is set, based on the temperature data inside and outside the vehicle, that an air-blowing temperature of the air conditioner is T2 and air-blowing duration of the air conditioner is S1, so that the air conditioner is enabled at the air-blowing temperature T2 and disabled after being enabled for the duration S1, so as to reduce a temperature of the vehicle window and clean the fog on the vehicle window. If the temperature T1 inside the vehicle is less than the temperature T2 outside the vehicle, the air-blowing temperature of the air conditioner is T2, and it is set, based on the temperature data inside and outside the vehicle, that the air-blowing temperature of the air conditioner is T2 and the air-blowing duration of the air conditioner is S2, so that the air conditioner is enabled at the air-blowing temperature T2 and disabled after being enabled for the duration S2, so as to improve the temperature of the vehicle window and clean the fog on the vehicle window.

Optionally, after the cleaning tool is controlled to remove the first-type foreign object, step S401 to step S403 are performed again to detect whether the first-type foreign object still exists on the vehicle window. If the first-type foreign object still exists on the vehicle window, the cleaning tool is controlled again to remove the first-type foreign object.

(2) The cleaning tool is controlled to remove the second-type foreign object.

Optionally, in a possible implementation, the second cleaning tool is controlled to work at a preset working frequency for preset duration, to clean the second-type foreign object in the first region. The preset working frequency and the preset working duration of the second cleaning tool may be preset based on a cleaning effect of the second cleaning tool, or may be set by a driver.

In different traveling statuses or different driver statuses, adaptive adjustment is performed on working duration and a working frequency of the second cleaning tool, to minimize impact of vehicle window cleaning on the driver and ensure security in a vehicle traveling process.

Therefore, optionally, in another possible implementation, when the second cleaning tool is controlled to clean the second-type foreign object in the first region, the working duration of the second cleaning tool may be first determined based on a traveling status and/or a driver status, a first preset weight parameter corresponding to the traveling status and/or a first preset weight parameter corresponding to the driver status, and maximum duration in which the second cleaning tool continuously works. Then the working frequency of the second cleaning tool is determined based on the traveling status and/or the driver status, a second preset weight parameter corresponding to the traveling status and/or a second preset weight parameter corresponding to the driver status, and a maximum frequency at which the second cleaning tool works. Finally, the second cleaning tool is controlled based on the working duration of the second cleaning tool and the working frequency of the second cleaning tool to clean the first region, to remove the second-type foreign object. The traveling status may be a traveling speed of the vehicle, including a high speed, a medium speed, and a low speed. The driver status may be a fatigue degree of a driver, including severe fatigue, mild fatigue, and not fatigued. Details are not described below.

It should be noted that the first preset weight parameter and the second preset weight parameter may be preset, or may be set by a driver.

The working duration of the second cleaning tool may be determined based on the traveling status, may be determined based on the driver status, or may be determined in combination with the two factors.

For example, the working duration of the second cleaning tool is determined based on the traveling status, the driver status, the first preset weight parameter corresponding to the traveling status, the first preset weight parameter corresponding to the driver status, and a second preset algorithm $t_1 = t_{s\text{-}max} * (1 - e^{(\alpha_1 s_1^{-1} + \beta_1 s_2^{-1})})$, where $t_1$ is the working duration of the second cleaning tool, $t_{s\text{-}max}$ is the maximum duration in which the second cleaning tool continuously works, e is a base of a natural logarithm, $\alpha_1$ and $\beta_1$ are respectively the first preset weight parameters corresponding to the traveling status and the driver status, $\alpha_1 + \beta_1 = 1$, s1 represents the traveling status, and s2 represents the driver status. For example, a value of the traveling status s1 is $-1$, $-3$, and $-10$, respectively indicating that the traveling speed is a high speed, a medium speed, and a low speed. A value of the driver status s2 is $-1$, $-3$, and $-10$, respectively indicating that the driver status is severe fatigue, mild fatigue, and not fatigued. A larger value of s1 indicates a larger traveling speed; or a larger value of s2 indicates a more fatigued driver, and shorter working duration t1 of the second cleaning tool.

Alternatively, the working duration of the second cleaning tool is determined based on the traveling status, the first preset weight parameter corresponding to the traveling status, and a second preset algorithm $t_1 = t_{s\text{-}max} * (1 - e^{\alpha_1 s_1^{-1}})$, where t1 is the working duration of the second cleaning tool, ts-max is the maximum duration in which the second cleaning tool continuously works, e is the base of the natural logarithm, $\alpha_1$ is the first preset weight parameter corresponding to the traveling status, $\alpha_1 = 1$, and s1 represents the traveling status. For a value of s1, refer to the foregoing description.

Alternatively, the working duration of the second cleaning tool is determined based on the driver status, the first preset weight parameter corresponding to the driver status, and a second preset algorithm $t_1 = t_{s\text{-}max} * (1 - e^{\beta_1 s_2^{-1}})$, where t1 is the working duration of the second cleaning tool, ts-max is the maximum duration in which the second cleaning tool continuously works, e is the base of the natural logarithm, $\beta_1$ is the first preset weight parameter corresponding to the driver status, $\beta_1 = 1$, and s2 represents the driver status. For a value of s2, refer to the foregoing description.

Likewise, the working frequency of the second cleaning tool may be determined based on the traveling status, may be determined based on the driver status, or may be determined in combination with the two factors.

For example, the working frequency of the second cleaning tool is determined based on the traveling status, the driver status, the second preset weight parameter corresponding to the traveling status, the second preset weight parameter corresponding to the driver status, and a third preset algorithm $f=f_{max}*(1-e^{(\alpha_2 s_1^{-1}+\beta_2 s_2^{-1})})$, where f is the working frequency of the second cleaning tool, $f_{max}$ is the maximum frequency at which the second cleaning tool works, e is the base of the natural logarithm, $\alpha_2$ and $\beta_2$ are respectively the second preset weight parameters corresponding to the traveling status and the driver status, $\alpha_2+\beta_2=1$, s1 represents the traveling status, and s2 represents the driver status. For example, a value of the traveling status s1 is −1, −3, and −10, respectively indicating that the traveling speed is a high speed, a medium speed, and a low speed. A value of the driver status s2 is −1, −3, and −10, respectively indicating that the driver status is severe fatigue, mild fatigue, and not fatigued. A larger value of s1 indicates a larger traveling speed; or a larger value of s2 indicates a more fatigued driver, and a larger working frequency f of the second cleaning tool.

Alternatively, the working frequency of the second cleaning tool is determined based on the traveling status, the second preset weight parameter corresponding to the traveling status, and a third preset algorithm $f=f_{max}*(1-e^{\alpha_2 s_1^{-1}})$, where f is the working frequency of the second cleaning tool, fmax is the maximum frequency at which the second cleaning tool works, e is the base of the natural logarithm, $\alpha_2$ is the second preset weight parameter corresponding to the traveling status, $\beta_2=1$, and s1 represents the traveling status. For a value of s1, refer to the foregoing description.

Alternatively, the working frequency of the second cleaning tool is determined based on the driver status, the second preset weight parameter corresponding to the driver status, and a third preset algorithm $f=f_{max}*(1-e^{\beta_2 s_2^{-1}})$, where f is the working frequency of the second cleaning tool, $f_{max}$ is the maximum frequency at which the second cleaning tool works, e is the base of the natural logarithm, $\beta_2$ is the second preset weight parameter corresponding to the driver status, $\beta_2=1$, and s2 represents the driver status. For a value of s2, refer to the foregoing description.

It should be noted that, for example, in the second preset algorithm and the third preset algorithm, for the value of the traveling status s1 and the value of the driver status s2, reference may be made to the foregoing description. When s1=−1 (or s2=−1), t1 is relatively short and f is relatively large, so as to quickly remove a foreign object, and reduce obscuring of line-of-sight, thereby improving security of the driver in a high-speed traveling process. When s1=−3 (and/or s2=−3), t1 and f are moderate. When s1=−10 (or s2=−10), t1 is relatively long and f is relatively small, so as to reduce discomfort caused by an excessively large frequency of the second cleaning tool. In addition, a working time of the second cleaning tool becomes longer, so that vehicle window cleaning efficiency can be ensured.

(3) The cleaning tool is controlled to remove the first-type foreign object and the second-type foreign object.

It should be noted that if it is detected that the first-type foreign object and the second-type foreign object both exist on the vehicle window, the cleaning tool needs to be controlled to remove the first-type foreign object and the second-type foreign object. A sequence of controlling the cleaning tool to remove the first-type foreign object and controlling the cleaning tool to remove the second-type foreign object is not limited. The cleaning tool may be first controlled to remove the first-type foreign object, and then the cleaning tool is controlled to remove the second-type foreign object; or the cleaning tool may be first controlled to remove the second-type foreign object, and then the cleaning tool is controlled to remove the first-type foreign object; or the cleaning tool may be controlled to simultaneously remove the first-type foreign object and the second-type foreign object.

In an example, for an implementation of controlling the cleaning tool to remove the first-type foreign object and controlling the cleaning tool to remove the second-type foreign object, refer to the implementations described in (1) and (2) in this step.

In the automatic vehicle window cleaning method described in this embodiment of this application, the gray value of the pixel in the dark channel image corresponding to the single frame of vehicle window image is used to detect whether the first-type foreign object exists on the vehicle window, and/or the RGB values of the pixels in the i consecutive frames of vehicle window images are used to detect whether the second-type foreign object exists on the vehicle window. If the first-type foreign object and the second-type foreign object both exist or either of the first-type foreign object and the second-type foreign object exists on the vehicle window, the cleaning tool is controlled to remove the foreign object. The foreign object is first detected before being cleaned, so that blind cleaning can be reduced, thereby improving cleaning efficiency and saving cleaning resources. In addition, by using the foregoing process, the vehicle window may be automatically cleaned in this embodiment of this application, thereby reducing a manual operation and improving security in a vehicle traveling process.

To further improve accuracy of detecting whether the second-type foreign object exists on the vehicle window, this application further provides an automatic vehicle window cleaning method. After the first region is determined by using step S404, the method further includes the following steps S601 and S602. An embodiment of this application is described below with reference to FIG. 6.

S601. Determine, in each of j consecutive frames of vehicle window images, a second region corresponding to the first region, to obtain j second regions.

The j consecutive frames of vehicle window images are some of the plurality of frames of vehicle window images obtained by the camera by performing photographing a plurality of times in step S401, or the j consecutive frames of vehicle window images are some or all of a plurality of frames of vehicle window images obtained by the camera by performing photographing a plurality of times again, where j is an integer greater than 1, and there may include at least one other frame of vehicle window image or there may include no other frame of vehicle window image between the i consecutive frames of vehicle window images and the j consecutive frames of vehicle window images. In addition, a vehicle window region corresponding to all pixels in the second region is the first region.

Optionally, in a possible implementation, after the first region is determined, the j consecutive frames of vehicle window images after the i consecutive frames of vehicle window images are first obtained, and then the second region in each of the j consecutive frames of vehicle window images is determined based on a pixel location in a vehicle window image corresponding to the first region, to obtain the j second regions.

S602. If an RGB value of a pixel at a same location in the j second regions does not change, determine that a foreign object exists in the first region.

In a vehicle traveling process, if the second-type foreign object such as a falling leaf exists in the first region on the vehicle window, a picture (a pixel value) of the first region, on the vehicle window, in which the second-type foreign object such as the falling leaf exists does not change or changes to a relatively small degree with traveling of the vehicle. Therefore, if the RGB value of the pixel at the same location in the j second regions does not change, or a change degree of the RGB value at the same location in the j second regions does not exceed a preset change threshold, it is determined that the second-type foreign object really exists in the first region.

For example, each frame of vehicle window image includes 2×2 pixels, and j=2. In the j=2 consecutive frames of vehicle window images, a first frame of vehicle window image includes pixels A1, B1, C1, and D1, and a second frame of vehicle window image includes pixels A2, B2, C2, and D2. A second region that is in the first frame of vehicle window image and that corresponds to the first region is E1. E1 includes the pixels A1 and B1, and RGB values of the two pixels are respectively (1, 2, 3) and (3, 5, 6). A second region that is in the second frame of vehicle window image and that corresponds to the first region is E2. E2 includes the pixels A2 and B2, and RGB values of the two pixels are respectively (3, 2, 5) and (7, 5, 2). A difference between RGB values of pixels at a same location in the two second regions is calculated, that is, a difference (2, 0, 2) between the RGB values of the pixel A1 and the pixel A2, and a difference (4, 0, 4) between the pixel B1 and the pixel B2. If the preset change threshold is 2, in the j=2 second regions, for the difference between the RGB values of the pixel A1 and the pixel A2, 2+2>2; and for the difference between the RGB values of the pixel B1 and the pixel B2, 4+4>2. In an example, an RGB value of a pixel at a same location in the j=2 second regions changes, but a degree of the change does not exceed the preset change threshold 2. Therefore, it may be determined that the second-type foreign object exists in the first region in this example.

Optionally, when it is determined that the RGB value of the pixel at the same location in the j second regions changes, a third region that is in the image background model corresponding to the i consecutive frames of vehicle window images and that corresponds to the first region may be first determined. Then, a difference between an RGB value of a pixel in each second region and an RGB value of a pixel at a same location in the third region is determined, and obtained differences are accumulated to obtain an accumulated value. If the accumulated value exceeds a preset threshold, it is determined that the RGB value of the pixel at the same location in the j second regions changes; or if the accumulated value does not exceed the preset threshold, it is determined that the RGB value of the pixel at the same location in the j second regions does not change.

For example, j=2. A $1^{st}$ second region includes a pixel A1 and a pixel B1, and RGB values of the two pixels are respectively (1, 2, 3) and (3, 5, 6). A 2nd second region includes a pixel A2 and a pixel B2, and RGB values of the two pixels are respectively (3, 2, 5) and (7, 2, 5). After the j=2 second regions are determined, the third region that is in the image background model corresponding to the i consecutive frames of vehicle window images and that corresponds to the first region is determined based on a vehicle window region corresponding to the first region. The third region includes pixels A3 and B3, and RGB values of the two pixels are respectively (2, 0, 2) and (4, 3, 1). An accumulated value of differences between the RGB values of all the pixels in the second region and RGB values of pixels at same locations in the third region is determined based on $h=\Sigma_k \|F_0-f_k\|_x$. $F_0$ Represents the third region, $f_k$ represents a second region corresponding to a kth frame of vehicle window image in the j consecutive frames of vehicle window images, k is an integer greater than 0, $\|\cdot\|_x$ is a distance measurement function. In this example, a measurement algorithm of the distance measurement function is an absolute value algorithm. Therefore, it may be determined that absolute values of differences between the RGB value of the pixel A3 in the third region and the RGB values of the pixels A1 and A2 in the second region are respectively (1, 2, 1) and (1, 2, 5), and that differences between the RGB value of the pixel B3 in the third region and the RGB values of the pixels B1 and B2 in the second region are respectively (1, 2, 5) and (3, 1, 4). These differences are accumulated to obtain an accumulated value h (6, 7, 15). If the preset threshold is 0, because 6+7+15>0, it is determined that the RGB value of the pixel at the same location in the j=2 second regions changes in this example; or if the preset threshold is 30, because 6+7+15<30, it is determined that the RGB value of the pixel at the same location in the j=2 second regions does not change in this example.

Optionally, in another possible implementation, when it is determined that the RGB value of the pixel at the same location in the j second regions changes, a third region that is in the image background model corresponding to the i consecutive frames of vehicle window images and that corresponds to the first region may be first determined, then a fourth region that is in an image background model corresponding to the j consecutive frames of vehicle window images and that corresponds to the first region is determined, and differences between RGB values of pixels in the third region and RGB values of pixels in the fourth region are calculated, and the obtained differences are accumulated to obtain an accumulated value. If the accumulated value exceeds a preset threshold, it is determined that the RGB value of the pixel at the same location in the j second regions changes; or if the accumulated value does not exceed the preset threshold, it is determined that the RGB value of the pixel at the same location in the j second regions does not change.

For example, j=2. A 1st second region includes a pixel A1 and a pixel B1, and RGB values of the two pixels are respectively (1, 2, 3) and (3, 5, 6). A 2nd second region includes a pixel A2 and a pixel B2, and RGB values of the two pixels are respectively (3, 2, 5) and (7, 2, 6). After the j=2 second regions are determined, the third region that is in the image background model corresponding to the i consecutive frames of vehicle window images and that corresponds to the first region is determined based on the vehicle window region corresponding to the first region. The third region includes pixels A3 and B3, and RGB values of the two pixels are respectively (1, 0, 1) and (4, 3, 1). Then a fourth region that is in an image background model corresponding to the j=2 consecutive frames of vehicle window images and that corresponds to the first region is determined. The fourth region includes pixels A4 and B4, and RGB values of the two pixels are respectively (1, 0, 1) and (2, 1, 0). An accumulated value of Hamming distances between the RGB values of the pixels in the third region and RGB values of pixels at same locations in the fourth region is determined based on $h=\Sigma_k\|F_0-f_k\|_x$. $F_0$ represents the third region, $f_k$ represents the fourth region that is in the image background model of the j consecutive frames of vehicle window images and that corresponds to the first region, k=j, $\|\cdot\|_x$ is a distance measurement function. In this example, a measurement algorithm of the distance measurement function is a Hamming distance algorithm. The RGB value of the pixel A3 in the third region is the same as the RGB value of the pixel A4 in the fourth region. In this case, a Hamming distance between the pixel A3 in the third region and the pixel A4 in the fourth region is 0. The RGB value of the pixel A4 in the third region is different from the RGB value of the pixel B4 in the fourth region. In this case, a Hamming distance between the pixel B3 in the third region and the pixel B4 in the fourth region is 3. Therefore, a Hamming distance between the third region and the fourth region is 1, and h=1. If the preset threshold is 0, it is determined that the RGB value of the pixel at the same location in the j=2 second regions changes in this example; or if the preset threshold is 2, it is determined that the RGB value of the pixel at the same location in the j=2 second regions does not change in this example.

It should be noted that, compared with the absolute value algorithm, a speed of data processing may be improved if data processing is performed by using the Hamming distance measurement algorithm. If the Hamming distance is represented by using a binary system, a speed of data processing may be further accelerated, so as to improve efficiency of determining a region in which the second-type foreign object is located. In an example, a representation form of the Hamming distance may be further determined as an octal system, a hexadecimal system, or the like based on an actual requirement, and is not limited to the binary or decimal system. Optionally, in addition to the absolute value algorithm and the Hamming distance, the measurement algorithm of the distance measurement function represented by $\|\cdot\|_x$ may be a Euclidean distance algorithm or the like.

Optionally, in another possible implementation, when it is determined that the RGB value of the pixel at the same location in the j second region changes, a fifth region that is in the average value image corresponding to the i consecutive frames of vehicle window images and that corresponds to the first region may be first determined. Then differences between RGB values of pixels in each second region and RGB values of pixels at same locations in the fifth region are determined, and the differences are accumulated to obtain an accumulated value. If the accumulated value exceeds a preset threshold, it is determined that the RGB value of the pixel at the same location in the j second regions changes; or if the accumulated value does not exceed the preset threshold, it is determined that the RGB value of the pixel at the same location in the j second regions does not change.

In this embodiment of this application, after the first region is determined by using the i consecutive frames of vehicle window images, the j second regions are determined based on the j consecutive frames of vehicle window images after the i consecutive frames of vehicle window images, and it is verified, based on the j second regions, whether the second-type foreign object really exists in the first region, so as to improve accuracy of determining that the second-type foreign object exists on the vehicle window, and further improve efficiency of automatically cleaning the vehicle window.

To better clean the second-type foreign object existing in the first region and ensure a good automatic cleaning effect, this application further provides an automatic vehicle window cleaning method. When a cleaning tool is controlled to remove the second-type foreign object, the cleaning tool may further include a third cleaning tool. The third cleaning tool, such as windshield washer fluid, is mainly used to clean a vehicle window. Therefore, after the second-type foreign object in the first region is cleaned by using the second cleaning tool based on implementation (2) and implementation (3) in step 405, the second-type foreign object in the first region may be further removed in combination with the third cleaning tool. In an example, the method further includes steps S701 to S703. An embodiment of this application is described below with reference to FIG. 7.

S701. Determine whether the second-type foreign object in the first region on the vehicle window is cleaned.

Figure 6:
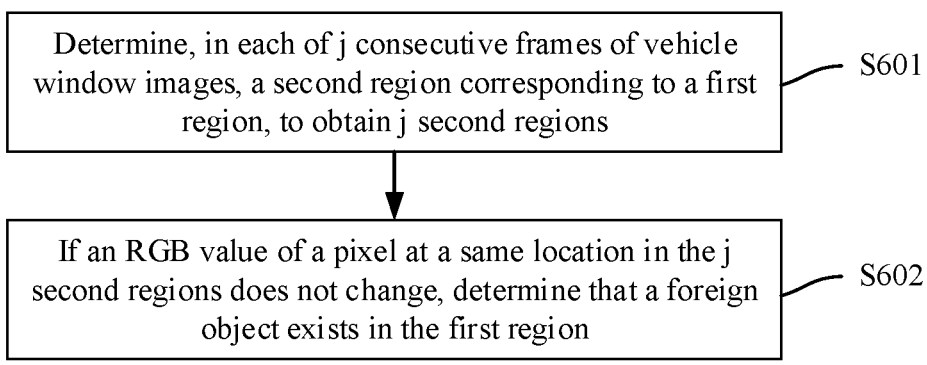
FIG. 6 is a second schematic flowchart of an automatic vehicle window cleaning method according to an embodiment of this application.

The first region is the first region determined in step S404, that is, the first region in the method in FIG. 6.

In an example, for an implementation of this step S701, refer to the real-time manner described in step S404 in the foregoing embodiment.

Optionally, after the second cleaning tool is controlled to remove the second-type foreign object in the first region, step S701 is performed to determine whether the second-type foreign object in the first region on the vehicle window is cleaned. If the second-type foreign object in the first region on the vehicle window is cleaned, an automatic vehicle window cleaning process ends, and a camera in the vehicle keeps enabled to monitor the vehicle window in real time. Alternatively, if the second-type foreign object in the first region on the vehicle window is not cleaned (that is, the second-type foreign object still exists in the first region on the vehicle window), the following step S702 is performed.

S702. Control the third cleaning tool to remove the second-type foreign object.

Optionally, if it is determined that the second-type foreign object in the first region on the vehicle window is not cleaned, the third cleaning tool may be controlled to work at a preset working interval for preset duration, to clean the second-type foreign object in the first region. The preset working interval and the preset working duration of the third cleaning tool may be preset based on a cleaning effect of the third cleaning tool, or may be set by a driver. Optionally, the third cleaning tool may be cleaning liquid, and the working duration of the third cleaning tool is duration of spraying the cleaning liquid.

In different traveling statuses or different driver statuses, adaptive adjustment is performed on working duration and a working interval of the third cleaning tool, to minimize impact of vehicle window cleaning on a driver and ensure security in a vehicle traveling process. Therefore, in a possible implementation, when the third cleaning tool is controlled to clean the second-type foreign object in the first region, the working duration of the third cleaning tool may be first determined based on a traveling status and/or driver status, a third preset weight parameter corresponding to the traveling status and/or a third preset weight parameter corresponding to the driver status, and maximum duration in which the third cleaning tool continuously works. Then the working interval of the third cleaning tool is determined based on the traveling status and/or the driver status, a fourth preset weight parameter corresponding to the traveling status and/or a fourth preset weight parameter corresponding to the driver status, and a maximum interval at which the third cleaning tool works. Finally, the third cleaning tool is controlled based on the working duration of the third cleaning tool and the working interval of the third cleaning tool to clean the first region, and the second cleaning tool is further controlled based on the working duration of the second cleaning tool and the working frequency of the second cleaning tool to clean the first region, to remove the second-type foreign object. Optionally, the third cleaning tool may be cleaning liquid, and the working duration of the third cleaning tool is duration of spraying the cleaning liquid. In addition, the traveling status may be a traveling speed of the vehicle, including a high speed, a medium speed, and a low speed. The driver status may be a fatigue degree of a driver, including severe fatigue, mild fatigue, and not fatigued. Details are not described below.

It should be noted that the first third weight parameter and the fourth preset weight parameter may be preset, or may be set by a driver.

The working duration of the third cleaning tool may be determined based on the traveling status, may be determined based on the driver status, or may be determined in combination with the two factors.

For example, the working duration of the third cleaning tool is determined based on the traveling status, the driver status, the third preset weight parameter corresponding to the traveling status, the third preset weight parameter corresponding to the driver status, and a fourth preset algorithm $t_2=t_{1-max}*(1-e^{(\alpha_3 s_1^{-1}+\beta_3 s_2^{-1})})$, where $t_2$ is the working duration of the third cleaning tool, $t_{1-max}$ is the maximum duration in which the third cleaning tool continuously works, e is the base of the natural logarithm, $\alpha_3$ and $\beta_3$ are respectively the third preset weight parameters corresponding to the traveling status and the driver status, $\alpha_3+\beta_3=1$, s1 represents the traveling status, and s2 represents the driver status. For example, a value of the traveling status s1 is −1, −3, and −10, respectively indicating that the traveling speed is a high speed, a medium speed, and a low speed. A value of the driver status s2 is −1, −3, and −10, respectively indicating that the driver status is severe fatigue, mild fatigue, and not fatigued. A larger value of $s_1$ indicates a larger traveling speed; or a larger value of $s_2$ indicates a more fatigued driver, and shorter working duration $t_2$ of the third cleaning tool.

Alternatively, the working duration of the third cleaning tool is determined based on the traveling status, the third preset weight parameter corresponding to the traveling status, and a fourth preset algorithm $t_2=t_{1-max}*(1-e^{\alpha_3 s_1^{-1}})$, where $t_2$ is the working duration of the third cleaning tool, t1-max is the maximum duration in which the third cleaning tool continuously works, e is the base of the natural logarithm, $\alpha_3$ is the third preset weight parameter corresponding to the traveling status, $\alpha_3=1$, and s1 represents the traveling status. For a value of s1, refer to the foregoing description.

Alternatively, the working duration of the third cleaning tool is determined based on the driver status, the third preset weight parameter corresponding to the driver status, and a fourth preset algorithm $t_2=t_{1-max}*(1-e^{\beta_3 s_2^{-1}})$, where t2 is the working duration of the third cleaning tool, t1-max is the maximum duration in which the third cleaning tool continuously works, e is the base of the natural logarithm, $\beta_3$ is the third preset weight parameter corresponding to the driver status, $\beta_3=1$, and s2 represents the driver status. For a value of s2, refer to the foregoing description.

Likewise, the working interval of the third cleaning tool may be determined based on the traveling status, may be determined based on the driver status, or may be determined in combination with the two factors.

For example, the working interval of the third cleaning tool is determined based on the traveling status, the driver status, the fourth preset weight parameter corresponding to the traveling status, the fourth preset weight parameter corresponding to the driver status, and a fifth preset algorithm $\Delta t=\Delta t_{max}*(1-e^{(\alpha_4 s_1^{-1}+\beta_4 s_2^{-1})})$, where $\Delta t$ is the working interval of the third cleaning tool, $\Delta t_{max}$ is the maximum interval at which the third cleaning tool works, e is the base of the natural logarithm, $\alpha_4$ and $\beta_4$ are respectively the fourth preset weight parameters corresponding to the traveling status and the driver status, $\alpha_4+\beta_4=1$, s1 represents the traveling status, and s2 represents the driver status. For example, a value of the traveling status s1 is −1, −3, and −10, respectively indicating that the traveling speed is a high speed, a medium speed, and a low speed. A value of the driver status s2 is −1, −3, and −10, respectively indicating that the driver status is severe fatigue, mild fatigue, and not fatigued. A larger value of s1 indicates a larger traveling speed; or a larger value of s2 indicates a more fatigued driver, and a shorter working interval $\Delta t$ of the third cleaning tool.

Alternatively, the working interval of the third cleaning tool is determined based on the traveling status, the driver status, the fourth preset weight parameter corresponding to the traveling status, the fourth preset weight parameter corresponding to the driver status, and a fifth preset algorithm $\Delta t=\Delta t_{max}*(1-e^{\alpha_4 s_1^{-1}})$, where $\Delta t$ is the working interval of the third cleaning tool, $\Delta t_{max}$ is the maximum interval at which the third cleaning tool works, e is the base of the natural logarithm, $\alpha_4$ is the fourth preset weight parameter corresponding to the driver status, $\alpha_4=1$, and s1 represents the traveling status. For a value of s1, refer to the foregoing description.

Alternatively, the working interval of the third cleaning tool is determined based on the driver status, the fourth preset weight parameter corresponding to the driver status, and a fifth preset algorithm $\Delta t=\Delta t_{max}*(1-e^{\beta_4 s_2^{-1}})$, where $\Delta t$ is the working interval of the third cleaning tool, $\Delta t_{max}$ is the maximum interval at which the third cleaning tool works, e is the base of the natural logarithm, $\beta_4$ is the fourth preset weight parameter corresponding to the driver status, $\beta_4=1$, and s2 represents the driver status. For a value of s2, refer to the foregoing description.

It should be noted that, for example, in the fourth preset algorithm and the fifth preset algorithm, for the value of the traveling status s1 and the value of the driver status s2, reference may be made to the foregoing description. When s1=−1 (or s2=−1), t2 is relatively short and $\Delta t$ is relatively large, so as to reduce discomfort and obscuring of line-of-sight that are caused in a cleaning process by a relatively small working interval of the third cleaning tool, thereby improving security of a driver in a high-speed traveling process. When s1=−3 (and/or s2=−3), t2 and $\Delta t$ are moderate. When s1=−10 (or s2=−10), t2 is relatively short and $\Delta t$ is relatively small, so that a working time of the third cleaning tool becomes longer, thereby ensuring cleaning of the vehicle window.

S703. Control the second cleaning tool to remove the second-type foreign object.

After the third cleaning tool is controlled based on the working duration of the third cleaning tool and the working interval of the third cleaning tool to clean the first region, the second cleaning tool is controlled again based on the working duration of the second cleaning tool and the working frequency of the second cleaning tool to clean the first region, to remove the second-type foreign object in the first region. In an example, for an implementation of controlling the second cleaning tool to remove the second-type foreign object in the first region, refer to the implementation described in (2) in step S405 in the foregoing embodiment, and details are not described herein again.

It should be noted that after step S703 is completed, step S701 further needs to be performed again to determine whether the second-type foreign object on the vehicle window is cleaned. If the second-type foreign object in the first region on the vehicle window is cleaned, the automatic vehicle window cleaning process ends, and the camera in the vehicle keeps enabled to monitor the vehicle window in real time. Alternatively, if the second-type foreign object in the first region on the vehicle window is not cleaned (that is, the second-type foreign object still exists in the first region on the vehicle window), after q operations of controlling the second cleaning tool and the third cleaning tool based on the working duration of the second cleaning tool, the working frequency of the second cleaning tool, the working duration of the third cleaning tool, and the working interval of the third cleaning tool to remove the second-type foreign object are completed, the automatic vehicle window cleaning process ends, and the camera in the vehicle keeps enabled to monitor the vehicle window in real time, where q may be determined by a driver, or may be preset based on a cleaning effect of the second cleaning tool and the third cleaning tool. By using the foregoing process, the second-type foreign object that is not cleaned on the vehicle window is automatically cleaned a plurality of times in this embodiment of this application, so as to remove as more as second-type foreign objects existing on the vehicle window, thereby achieving a better automatic cleaning effect.

In this embodiment of this application, after the second cleaning tool is controlled to clean the second-type foreign object in the first region, it is first determined whether the second-type foreign object in the first region is cleaned. If the second-type foreign object in the first region is not cleaned, the third cleaning tool and the second cleaning tool are controlled to clean the second-type foreign object. Through cooperation between a plurality of cleaning tools, the second-type foreign object existing on the vehicle window can be removed as more as possible in this embodiment of this application, thereby achieving a better automatic cleaning effect.

Figure 8:
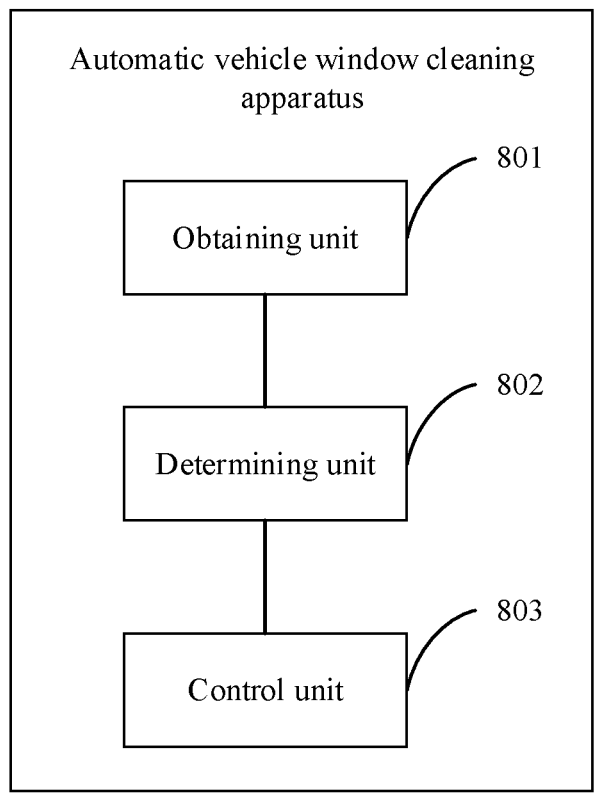
FIG. 8 is a first schematic structural diagram of an automatic vehicle window cleaning apparatus according to an embodiment of this application.

In this embodiment of this application, the automatic vehicle window cleaning apparatus may be divided into functional modules based on the foregoing method example. When each functional module is obtained through division based on each corresponding function, FIG. 8 is a possible schematic structural diagram of the automatic vehicle window cleaning apparatus in the foregoing embodiment. As shown in FIG. 8, the automatic vehicle window cleaning apparatus includes an obtaining unit 801, a determining unit 802, and a control unit 803. Certainly, the automatic vehicle window cleaning apparatus may further include another module, or the automatic vehicle window cleaning apparatus may include fewer modules.

The obtaining unit 801 is configured to obtain a vehicle window image.

The determining unit 802 is configured to determine a dark channel image corresponding to a single frame of vehicle window image.

The determining unit 802 is further configured to determine, based on a quantity of pixels whose gray values exceed a preset gray threshold in the dark channel image and/or definition of the dark channel image, that a first-type foreign object exists on a vehicle window.

In an example, the determining unit 802 is configured to, if a quantity of pixels whose gray values each do not exceed the preset gray threshold in the dark channel image is less than or equal to the quantity of pixels whose gray values exceed the preset gray threshold in the dark channel image, and/or the definition of the dark channel image is lower than preset definition, determine that the first-type foreign object exists on the vehicle window. The definition of the dark channel image is a variance of gray values of pixels in the dark channel image.

In addition/alternatively, the determining unit 802 is further configured to determine, based on RGB values of pixels in i consecutive frames of vehicle window images, that a second-type foreign object exists on the vehicle window.

In an example, the determining unit 802 is further configured to first establish an image background model based on the RGB values of the pixels in the i consecutive frames of vehicle window images; determine a first region based on an RGB value of a pixel in the image background model; and further determine that the second-type foreign object exists in the first region. The RGB value of the pixel in the image background model represents a change of an RGB value of a pixel at a same location in the i consecutive frames of vehicle window images, i is an integer greater than 1, and the first region is a vehicle window region corresponding to a pixel whose RGB value does not change in the i consecutive frames of vehicle window images.

For example, the determining unit 802 is further configured to determine an average value image of the i consecutive frames of vehicle window images based on an average value of RGB values of pixels at a same location in the i consecutive frames of vehicle window images; and establish the image background model based on a difference between an RGB value of a pixel in the average value image of the i consecutive frames of vehicle window images and an RGB value of a pixel in an ith frame of vehicle window image.

For example, the determining unit 802 is further configured to determine the first region based on the RGB value of the pixel in the image background model and a first preset algorithm. The first preset algorithm is a saliency detection algorithm or a target detection algorithm.

For example, the determining unit 802 is further configured to determine a third region that is in the image background model and that corresponds to the first region; determine a difference between an RGB value of a pixel in each second region and an RGB value of a pixel at a same location in the third region, and accumulate the differences to obtain an accumulated value; and if the accumulated value exceeds a preset threshold, determine that an RGB value of a pixel at a same location in the j second regions changes.

Optionally, in another possible implementation, after determining the first region, the determining unit 802 determines, in each of j consecutive frames of vehicle window images, a second region corresponding to the first region, to obtain j second regions; and if an RGB value of a pixel at a same location in the j second regions does not change, determines that the second-type foreign object exists in the first region. The j consecutive frames of vehicle window images are located after the i consecutive frames of vehicle window images, and j is an integer greater than 1.

The control unit 803 is configured to control a cleaning tool to remove a foreign object. The foreign object includes the first-type foreign object and/or the second-type foreign object.

Optionally, the control unit 803 is configured to control, based on temperature data inside and outside a vehicle, a first cleaning tool to be enabled for preset duration to remove the first-type foreign object.

In addition/alternatively, the control unit 803 is configured to control, based on working duration of a second cleaning tool and a working frequency of the second cleaning tool, the second cleaning tool to clean the first region to remove the second-type foreign object. The working duration of the second cleaning tool is determined based on a traveling status and/or a driver status, a first preset weight parameter corresponding to the traveling status and/or a first preset weight parameter corresponding to the driver status, and maximum duration in which the second cleaning tool continuously works. The working frequency of the second cleaning tool is determined based on the traveling status and/or the driver status, a second preset weight parameter corresponding to the traveling status and/or a second preset weight parameter corresponding to the driver status, and a maximum frequency at which the second cleaning tool works.

Optionally, the control unit 803 is further configured to determine the working duration of the second cleaning tool based on the traveling status, the driver status, the first preset weight parameter corresponding to the traveling status, the first preset weight parameter corresponding to the driver status, the maximum duration in which the second cleaning tool continuously works, and a second preset algorithm. The second preset algorithm is $t_1 = t_{s-max} * (1 - e^{(\alpha_1 s_1^{-1} + \beta_1 s_2^{-1})})$. The control unit 803 is further configured to determine the working frequency of the second cleaning tool based on the traveling status, the driver status, the second preset weight parameter corresponding to the traveling status, the second preset weight parameter corresponding to the driver status, the maximum frequency at which the second cleaning tool works, and a third preset algorithm. The third preset algorithm is $f = f_{max} * (1 - e^{(\alpha_2 s_1^{-1} + \beta_2 s_2^{-1})})$, where $t_1$ is the working duration of the second cleaning tool, $t_{s-max}$ is the maximum duration in which the second cleaning tool continuously works, f is the working frequency of the second cleaning tool, $f_{max}$ is the maximum frequency at which the second cleaning tool works, e is a base of a natural logarithm, $\alpha_1$ and $\beta_1$ are respectively the first preset weight parameters corresponding to the traveling status and the driver status, $\alpha_1 + \beta_1 = 1$, $\alpha_2$ and $\beta_2$ are respectively the second preset weight parameters corresponding to the traveling status and the driver status, $\alpha_2 + \beta_2 = 1$, $s_1$ represents the traveling status, and $s_2$ represents the driver status.

Optionally, the control unit 803 is further configured to first determine working duration of a third cleaning tool based on the traveling status and/or the driver status, a third preset weight parameter corresponding to the traveling status and/or a third preset weight parameter corresponding to the driver status, and maximum duration in which the third cleaning tool continuously works; then determine a working interval of the third cleaning tool based on the traveling status and/or the driver status, a fourth preset weight parameter corresponding to the traveling status and/or a fourth preset weight parameter corresponding to the driver status, and a maximum interval at which the third cleaning tool works; and finally control, based on the working duration of the third cleaning tool and the working interval of the third cleaning tool, the third cleaning tool to clean the first region; and control, based on the working duration of the second cleaning tool and the working frequency of the second cleaning tool, the second cleaning tool to clean the first region, to remove the second-type foreign object.

In an example, the control unit 803 is configured to determine the working duration of the third cleaning tool based on the traveling status, the driver status, the third preset weight parameter corresponding to the traveling status, the third preset weight parameter corresponding to the driver status, the maximum duration in which the third cleaning tool continuously works, and a fourth preset algorithm. The fourth preset algorithm is $t_2 = t_{1-max} * (1 - e^{(\alpha_3 s_1^{-1} + \beta_3 s_2^{-1})})$. The control unit 803 is further configured to determine the working interval of the third cleaning tool based on the traveling status, the driver status, the fourth preset weight parameter corresponding to the traveling status, the fourth preset weight parameter corresponding to the driver status, the maximum interval at which the third cleaning tool works, and a fifth preset algorithm. The fifth preset algorithm is $\Delta t = \Delta t_{max} * (1 - e^{(\alpha_4 s_1^{-1} + \beta_4 s_2^{-1})})$, where t2 is the working duration of the third cleaning tool, t1-max is the maximum duration in which the third cleaning tool continuously works, $\Delta t$ is the working interval of the third cleaning tool, $\Delta t_{max}$ is the maximum interval at which the third cleaning tool works, e is the base of the natural logarithm, $\alpha_3$ and $\beta_3$ are respectively the third preset weight parameters corresponding to the traveling status and the driver status, $\alpha_3 + \beta_3 = 1$, $\alpha_4$ and $\beta_4$ are respectively the fourth preset weight parameters corresponding to the traveling status and the driver status, $\alpha_4 + \beta_4 = 1$, s1 represents the traveling status, and s2 represents the driver status.

Figure 9:
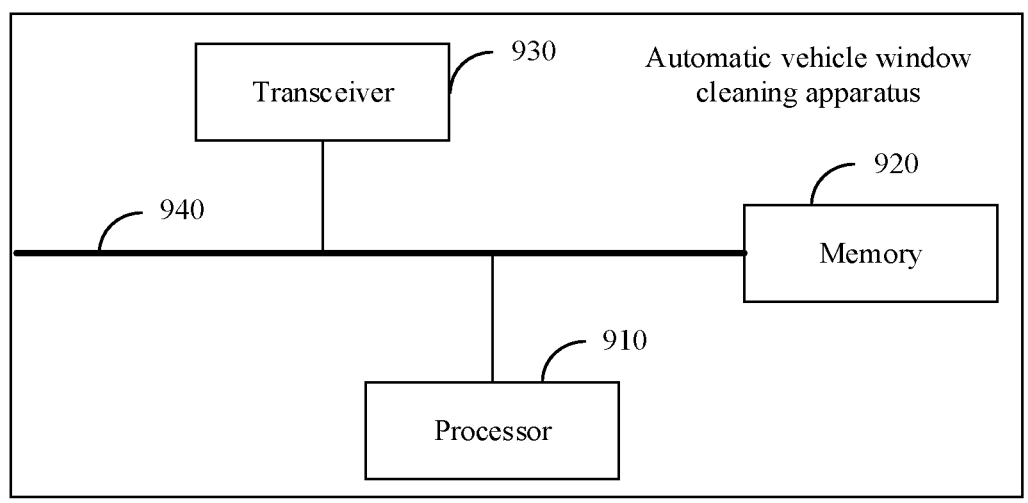
FIG. 9 is a second schematic structural diagram of an automatic vehicle window cleaning apparatus according to an embodiment of this application.

Referring to FIG. 9, this application further provides an automatic vehicle window cleaning apparatus, including a processor 910 and a memory 920.

The processor 910 and the memory 920 are connected to each other (for example, connected to each other by using a bus 940).

Optionally, the automatic vehicle window cleaning apparatus may further include a transceiver 930. The transceiver 930 is connected to the processor 910 and the memory 920, and the transceiver is configured to receive/send data.

Figure 4:
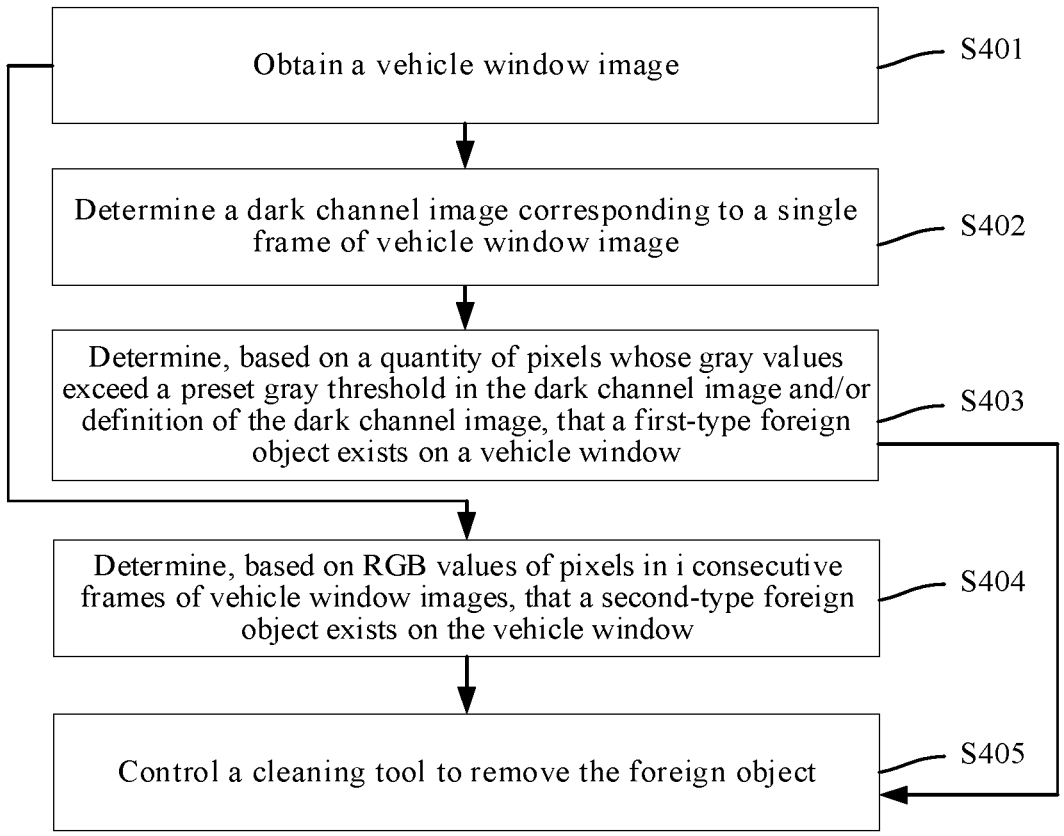
FIG. 4 is a first schematic flowchart of an automatic vehicle window cleaning method according to an embodiment of this application.
Figure 7:
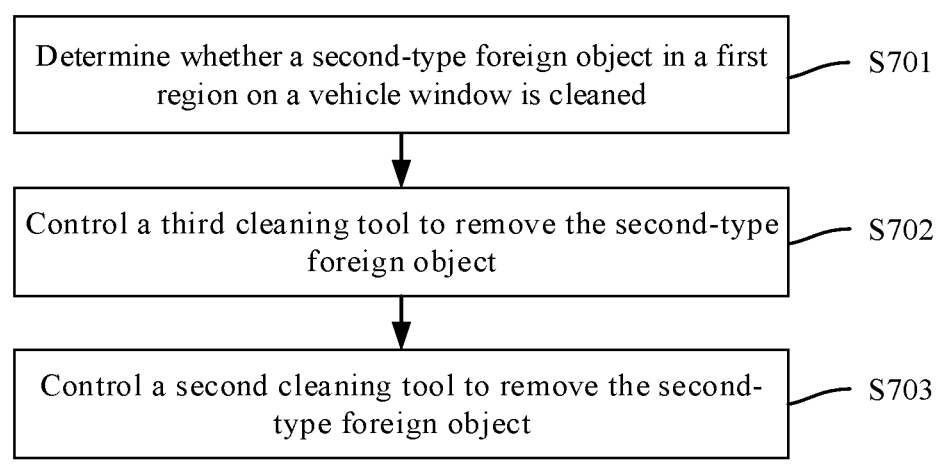
FIG. 7 is a third schematic flowchart of an automatic vehicle window cleaning method according to an embodiment of this application.

The processor 910 may perform any of the implementation solutions corresponding to FIG. 4, FIG. 6, and FIG. 7 and an operation of a feasible implementation of the implementation solution. For example, the processor 910 is configured to perform operations of the obtaining unit 801, the determining unit 802, and the control unit 803, and/or another operation described in the embodiments of this application.

For a description of the processor, the memory, the bus, and the transceiver, refer to the foregoing description, and details are not described herein again.

This application further provides an automatic vehicle window cleaning apparatus, including a non-volatile storage medium and a central processing unit. The non-volatile storage medium stores an executable program. The central processing unit is connected to the non-volatile storage medium, and executes the executable program to implement the automatic vehicle window cleaning method shown in FIG. 4, FIG. 6, or FIG. 7 in the embodiments of this application.

Another embodiment of this application further provides a computer-readable storage medium. The computer-readable storage medium includes one or more pieces of program code. The one or more programs include instructions. When a processor executes the program code, the automatic vehicle window cleaning apparatus performs the automatic vehicle window cleaning method shown in FIG. 4, FIG. 6, or FIG. 7.

Another embodiment of this application further provides a computer program product. The computer program product includes computer executable instructions, and the computer executable instructions are stored in a computer-readable storage medium. At least one processor of the automatic vehicle window cleaning apparatus may read the computer executable instructions from the computer-readable storage medium. The at least one processor executes the computer executable instructions, so that the automatic vehicle window cleaning apparatus performs corresponding steps in the automatic vehicle window cleaning method shown in FIG. 4, FIG. 6, or FIG. 7.

It may be understood by a person skilled in the art that, for the purpose of convenient and brief description, for a detailed working process of the foregoing system, apparatus, and unit, refer to a corresponding process in the foregoing method embodiments, and details are not described herein again.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are implementations of this application, and are not intended to limit the protection scope of this application. Any variation or replacement within the technical scope disclosed in this application shall fall within the protection scope of this application.

What is claimed is:

1. An automatic vehicle window cleaning method implemented by a hardware processor of vehicle window cleaning apparatus, comprising:
    obtaining consecutive frames of vehicle window images of a vehicle window;
    detecting a foreign object exists on the vehicle window based on red, green, and blue (RGB) values of pixels in a first number of the consecutive frames of the vehicle window images:
        establishing an image background model based on the RGB values, wherein a first RGB value of the RGB values of a pixel in the image background model represents a change of a second RGB value of the RGB values of a pixel at a same location in the first number of the consecutive frames, wherein the first number is an integer greater than 1;
        determining a first region based on the first RGB value, wherein the first region is a vehicle window region corresponding to a pixel whose RGB value does not change in the first number of the consecutive frames; and
        detecting that the foreign object exists in the first region;
    determining a working duration of a clean tool based on one or more of a traveling status, a driver status, a first preset weight parameter corresponding to the traveling status, a first preset weight parameter corresponding to the driver status, a maximum duration in which the clean tool continuously works, and a second preset algorithm, wherein the second preset algorithm is $t_1 = t_{s\text{-}max} * (1 - e^{(\alpha_1 s_1^{-1} + \beta_1 s_2^{-1})})$;

determining a working frequency of the clean tool based on one or more of the traveling status, the driver status, a second preset weight parameter corresponding to the traveling status, a second preset weight parameter corresponding to the driver status, and a maximum frequency at which the clean tool works, and a third preset algorithm, wherein the third preset algorithm is $f = f_{max} * (1 - e^{(\alpha_2 s_1^{-1} + \beta_2 s_2^{-1})})$, wherein $t_1$ is the working duration of the clean tool, wherein $t_{s\text{-}max}$ is the maximum duration in which the clean tool continuously works, wherein f is the working frequency of the clean tool, wherein $f_{max}$ is the maximum frequency at which the clean tool works, wherein e is a base of a natural logarithm, wherein $\alpha_1$ and $\beta_1$ are the first preset weight parameters corresponding to the traveling status and the driver status respectively, wherein $\alpha_1 + \beta_1 = 1$, wherein $\alpha_2$ and $\beta_2$ are the second preset weight parameters corresponding to the traveling status and the driver status respectively, $\alpha_2 + \beta_2 = 1$, wherein $s_1$ represents the traveling status, and wherein $s_2$ represents the driver status;
    controlling, based on the working frequency and the working duration, the clean tool to clean a first region of the vehicle window, wherein the first region includes the foreign object; and
    removing the foreign object responsive to controlling the clean tool to clean the first region.

2. The automatic vehicle window cleaning method of claim 1, wherein after determining the first region, the automatic vehicle window cleaning method further comprises:
    determining, in each of a second number of the consecutive frames of the vehicle window images, second regions corresponding to the first region, wherein the second number of the consecutive frames are located after the first number of the consecutive frames, and wherein the second number is an integer greater than 1; and
    detecting that the foreign object exists in the first region when a third RGB value of the RGB values of a pixel at a same location in the second regions does not change.

3. The automatic vehicle window cleaning method of claim 1, wherein the establishing further comprises:
    determining an average value image of the first number of the consecutive frames based on an average value of RGB values of pixels at a same location in the first number of the consecutive frames; and
    establishing the image background model based on a difference between an RGB value of a pixel in the average value image and an RGB value of a pixel at a same location in an ith frame of the first number of the consecutive frames.

4. The automatic vehicle window cleaning method of claim 1, further comprising determining the first region based on a first preset algorithm, and wherein the first preset algorithm is a saliency detection algorithm or a target detection algorithm.

5. The automatic vehicle window cleaning method of claim 2, wherein before detecting that the foreign object exists in the first region, the automatic vehicle window cleaning method further comprises:
    determining a third region that is in the image background model and that corresponds to the first region;
    determining differences between a third RGB value of the RGB values of a pixel in each of the second regions and a fourth RGB value of the RGB values of a pixel at a same location in the third region;
    accumulating the differences to obtain an accumulated value; and
    determining that the third RGB value changes.

6. The automatic vehicle window cleaning method of claim 1, wherein after controlling the clean tool to clean the first region, the automatic vehicle window cleaning method further comprises:
    determining a working duration of a second clean tool based on one or more of the traveling status, the driver status, a third preset weight parameter corresponding to the traveling status, a third preset weight parameter corresponding to the driver status, and a maximum duration in which the second clean tool continuously works;

determining a working interval of the second clean tool based on one or more of the traveling status, the driver status, a fourth preset weight parameter corresponding to the traveling status, a fourth preset weight parameter corresponding to the driver status, and a maximum interval at which the second clean tool works; and controlling, based on the working duration of the second clean tool and the working interval of the second clean tool, the second clean tool to clean the first region;

controlling, based on the working duration of the second clean tool and the working frequency of the second clean tool, the second clean tool to clean the first region; and removing the foreign object responsive to controlling the second clean tool to clean the first region.

7. The automatic vehicle window cleaning method of claim 6, further comprising:

further determining the working duration of the second clean tool based on a fourth preset algorithm, wherein the fourth preset algorithm is $t_2 = t_{1-max} * (1 - e^{(\alpha_3 s_1^{-1} + \beta_3 s_2^{-1})})$; and further determining the working interval of the second clean tool based on the traveling status, the driver status, the fourth preset weight parameter corresponding to the traveling status, the fourth preset weight parameter corresponding to the driver status, the maximum interval at which the second clean tool works, and a fifth preset algorithm, wherein the fifth preset algorithm is $\Delta t = \Delta t_{max} * (1 - e^{(\alpha_4 s_1^{-1} + \beta_4 s_2^{-1})})$, wherein $t_2$ is the working duration of the second clean tool, wherein $t_{1-max}$ is the maximum duration in which the second clean tool continuously works, wherein $\Delta t$ is the working interval of the second clean tool, wherein $\Delta t_{max}$ is the maximum interval at which the second clean tool works, wherein e is the base of a natural logarithm, wherein $\alpha 3$ and $\beta 3$ are the third preset weight parameters corresponding to the traveling status and the driver status respectively, wherein $\alpha 3 + \beta 3 = 1$, wherein $\alpha 4$ and $\beta 4$ are the fourth preset weight parameters corresponding to the traveling status and the driver status respectively, wherein $\alpha 4 + 4 = 1$, $s_1$ represents the traveling status, and wherein $s_2$ represents the driver status.

8. An automatic vehicle window cleaning apparatus, comprising:

a memory configured to store instructions;

a communications interface coupled to the memory and configured to communicate within a communications network; and a processor coupled to the memory and the communications interface, wherein the instructions that when executed by the processor cause the automatic vehicle window cleaning apparatus-to be configured to:

obtain consecutive frames of vehicle window images of a vehicle window;

detect a foreign object exists on the vehicle window based on red, green, and blue (RGB) values of pixels in a first number of the consecutive frames of the vehicle window images:

establishing an image background model based on the RGB values, wherein a first RGB value of the RGB values of a pixel in the image background model represents a change of a second RGB value of the RGB values of a pixel at a same location in the first number of the consecutive frames, wherein the first number is an integer greater than 1;

determining a first region based on the first RGB value, wherein the first region is a vehicle window region corresponding to a pixel whose RGB value does not change in the first number of the consecutive frames; and detecting that the foreign object exists in the first region;

determine a working duration of a clean tool based on one or more of a traveling status, a driver status, a first preset weight parameter corresponding to the traveling status, a first preset weight parameter corresponding to the driver status, a maximum duration in which the clean tool continuously works, and a second preset algorithm, wherein the second preset algorithm is $t_1 = t_{s-max} * (1 - e^{(\alpha_1 s_1^{-1} + \beta_1 s_2^{-1})})$;

determine a working frequency of the clean tool based on one or more of the traveling status, the driver status, a second preset weight parameter corresponding to the traveling status, a second preset weight parameter corresponding to the driver status, and a maximum frequency at which the clean tool works, and a third preset algorithm, wherein the third preset algorithm is $f = f_{max} * (1 - e^{(\alpha_2 s_1^{-1} + \beta_2 s_2^{-1})})$, wherein $t_1$ is the working duration of the clean tool, wherein $t_{s-max}$ is the maximum duration in which the clean tool continuously works, wherein f is the working frequency of the clean tool, wherein $f_{max}$ is the maximum frequency at which the clean tool works, wherein e is a base of a natural logarithm, wherein $\alpha 1$ and $\beta 1$ are the first preset weight parameters corresponding to the traveling status and the driver status respectively, wherein $\alpha 1 + \beta 1 = 1$, wherein $\alpha 2$ and $\beta 2$ are the second preset weight parameters corresponding to the traveling status and the driver status respectively, $\alpha 2 + \beta 2 = 1$, wherein $s_1$ represents the traveling status, and wherein $s_2$ represents the driver status;

control, based on the working frequency and the working duration, the clean tool to clean a first region of the vehicle window, wherein the first region includes the foreign object; and remove the foreign object responsive to controlling the clean tool to clean the first region.

9. The automatic vehicle window cleaning apparatus of claim 8, wherein the instructions further cause the automatic vehicle window cleaning apparatus to be configured to:

determine, in each of a second number of the consecutive frames of the vehicle window images, second regions that correspond to the first region, wherein the second number of the consecutive frames are located after the first number of the consecutive frames, and wherein the second number is an integer greater than 1; and detect that the foreign object exists in the first region when a third RGB value of the RGB values of a pixel at a same location in the second regions does not change.

10. The automatic vehicle window cleaning apparatus of claim 8, wherein the instructions further cause the automatic vehicle window cleaning apparatus to be configured to:

determine an average value image of the first number of the consecutive frames based on an average value of RGB values of pixels at a same location in the first number of the consecutive frames; and establish the image background model based on a difference between an RGB value of a pixel in the average value image and an RGB value of a pixel at a same location in an $i^{th}$ frame of the first number of the consecutive frames.

11. The automatic vehicle window cleaning apparatus of claim 8, wherein the instructions further cause the automatic vehicle window cleaning apparatus to be configured to determine the first region based on a first preset algorithm, wherein the first preset algorithm is a saliency detection algorithm or a target detection algorithm.

12. The automatic vehicle window cleaning apparatus of claim 9, wherein before determining that the foreign object exists in the first region, the instructions further cause the automatic vehicle window cleaning apparatus to be configured to:
   determine a third region that is in the image background model and that corresponds to the first region;
   determine differences between a third RGB value of the RGB values of a pixel in each of the second regions and a fourth RGB value of the RGB values of a pixel at a same location in the third region;
   accumulating the differences to obtain an accumulated value; and
   determine that the third RGB value changes.

13. A computer program product comprising computer-executable instructions that are stored on a non-transitory computer-readable medium and that when executed by a processor, cause the processor to be configured to:
   obtain consecutive frames of vehicle window images of a vehicle window;
   detect a foreign object exists on the vehicle window based on changes to red, green, and blue (RGB) values of pixels in a first number of the consecutive frames of the vehicle window images:
      establishing an image background model based on the RGB values, wherein a first RGB value of the RGB values of a pixel in the image background model represents a change of a second RGB value of the RGB values of a pixel at a same location in the first number of the consecutive frames, wherein the first number is an integer greater than 1;
      determining a first region based on the first RGB value, wherein the first region is a vehicle window region corresponding to a pixel whose RGB value does not change in the first number of the consecutive frames; and
      detecting that the foreign object exists in the first region;
   determine a working duration of a clean tool based on one or more of a traveling status, a driver status, a first preset weight parameter corresponding to the traveling status, a first preset weight parameter corresponding to the driver status, a maximum duration in which the clean tool continuously works, and a second preset algorithm, wherein the second preset algorithm is $t_1 = t_{s\text{-}max} * (1 - e^{(\alpha_1 s_1^{-1} + \beta_1 s_2^{-1})})$;
   determine a working frequency of the clean tool based on one or more of the traveling status, the driver status, a second preset weight parameter corresponding to the traveling status, a second preset weight parameter corresponding to the driver status, and a maximum frequency at which the clean tool works, and a third preset algorithm, wherein the third preset algorithm is $f = f_{max} * (1 - e^{(\alpha_2 s_1^{-1} + \beta_2 s_2^{-1})})$,
   wherein $t_1$ is the working duration of the clean tool, wherein $t_{s\text{-}max}$ is the maximum duration in which the clean tool continuously works, wherein f is the working frequency of the clean tool, wherein $f_{max}$ is the maximum frequency at which the clean tool works, wherein e is a base of a natural logarithm, wherein $\alpha 1$ and $\beta 1$ are the first preset weight parameters corresponding to the traveling status and the driver status respectively, wherein $\alpha 1 + \beta 1 = 1$, wherein $\alpha 2$ and $\beta 2$ are the second preset weight parameters corresponding to the traveling status and the driver status respectively, $\alpha 2 + \beta 2 = 1$, wherein $s_1$ represents the traveling status, and wherein $s_2$ represents the driver status;
   control, based on the working frequency and the working duration, the clean tool clean a first region of the vehicle window, wherein the first region includes the foreign object; and
   remove the foreign object responsive to controlling the clean tool to clean the first region.

14. The computer program product of claim 13, wherein the instructions further cause the processor to be configured to:
   determine, in each of a second number of the consecutive frames of the vehicle window images, second regions that correspond to the first region, wherein the second number of the consecutive frames are located after the first number of the consecutive frames, and wherein the second number is an integer greater than 1; and
   detect that the foreign object exists in the first region when a third RGB value of the RGB values of a pixel at a same location in the second regions does not change.

15. A vehicle, comprising:
   a vehicle window;
   an in-vehicle camera configured to obtain consecutive frames of vehicle window images of the vehicle window; and
   an automatic vehicle window clean tool coupled to the in-vehicle camera and configured to:
      detect a foreign object exists on the vehicle window based on changes to red, green, and blue (RGB) values of pixels in a first number of the consecutive frames of the vehicle window images:
         establishing an image background model based on the RGB values, wherein a first RGB value of the RGB values of a pixel in the image background model represents a change of a second RGB value of the RGB values of a pixel at a same location in the first number of the consecutive frames, wherein the first number is an integer greater than 1;
         determining a first region based on the first RGB value, wherein the first region is a vehicle window region corresponding to a pixel whose RGB value does not change in the first number of the consecutive frames; and
         detecting that the foreign object exists in the first region;
      determine a working duration of a clean tool based on one or more of a traveling status, a driver status, a first preset weight parameter corresponding to the traveling status, a first preset weight parameter corresponding to the driver status, a maximum duration in which the clean tool continuously works, and a second preset algorithm, wherein the second preset algorithm is $t_1 = t_{s\text{-}max} * (1 - e^{(\alpha_1 s_1^{-1} + \beta_1 s_2^{-1})})$;
      determine a working frequency of the clean tool based on one or more of the traveling status, the driver status, a second preset weight parameter corresponding to the traveling status, a second preset weight parameter corresponding to the driver status, and a maximum frequency at which the clean tool works, and a third preset algorithm, wherein the third preset algorithm is $f=f_{max}*(1-e^{(\alpha_2 s_1^{-1}+\beta_2 s_2^{-1})})$, wherein $t_1$ is the working duration of the clean tool, wherein $t_{s-max}$ is the maximum duration in which the clean tool continuously works, wherein f is the working frequency of the clean tool, wherein $f_{max}$ is the maximum frequency at which the clean tool works, wherein e is a base of a natural logarithm, wherein $\alpha 1$ and $\beta 1$ are the first preset weight parameters corresponding to the traveling status and the driver status respectively, wherein $\alpha 1+\beta 1=1$, wherein $\alpha 2$ and $\beta 2$ are the second preset weight parameters corresponding to the traveling status and the driver status respectively, $\alpha 2+\beta 2=1$, wherein $s_1$ represents the traveling status, and wherein $s_2$ represents the driver status; and control, based on the working frequency and the working duration, the clean tool to clean a first region of the vehicle window, wherein the first region includes the foreign object; and remove the foreign object responsive to controlling the clean tool to clean the first region.

\* \* \* \* \*

UNITED STATES PATENT AND TRADEMARK OFFICE
CERTIFICATE OF CORRECTION

| | |
|---|---|
| PATENT NO. | : 12,275,379 B2 |
| APPLICATION NO. | : 17/678334 |
| DATED | : April 15, 2025 |
| INVENTOR(S) | : Junhao Zhang et al. |

Page 1 of 1

It is certified that error appears in the above-identified patent and that said Letters Patent is hereby corrected as shown below:

In the Claims

Claim 6, Column 39, Line 9: "works; and" should read "works;"

Claim 12, Column 41, Line 21: "accumulating the" should read "accumulate the"

Claim 13, Column 42, Line 11: "clean tool clean a" should read "clean tool to clean a"

Signed and Sealed this
Twenty-fourth Day of June, 2025

Coke Morgan Stewart
*Acting Director of the United States Patent and Trademark Office*